United States Patent
Takahashi (12)

(10) Patent No.: US 10,288,831 B2
(45) Date of Patent: *May 14, 2019

(54) METHOD FOR ASSEMBLING CAMERA DEVICE AND METHOD FOR ASSEMBLING LENS UNIT

(71) Applicant: MITSUMI ELECTRIC CO., LTD., Tokyo (JP)

(72) Inventor: Mamoru Takahashi, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/569,796

(22) PCT Filed: Apr. 26, 2016

(86) PCT No.: PCT/JP2016/063025
§ 371 (c)(1),
(2) Date: Oct. 27, 2017

(87) PCT Pub. No.: WO2016/175198
PCT Pub. Date: Nov. 3, 2016

(65) Prior Publication Data
US 2018/0143395 A1   May 24, 2018

(30) Foreign Application Priority Data

Apr. 27, 2015 (JP) ................................. 2015-090377

(51) Int. Cl.
 G02B 7/02 (2006.01)
 G03B 15/00 (2006.01)
 H04N 5/225 (2006.01)

(52) U.S. Cl.
 CPC ............... *G02B 7/02* (2013.01); *G03B 15/00* (2013.01); *H04N 5/2254* (2013.01); *H04N 5/2257* (2013.01)

(58) Field of Classification Search
 CPC ...... G02B 7/02; H04N 5/2254; H04N 5/2257; G03B 15/00
 See application file for complete search history.

(56) References Cited

U.S. PATENT DOCUMENTS

2002/0145676 A1  10/2002  Kuno et al.
2009/0015706 A1*  1/2009  Singh ................... H04N 5/2253
                                                        348/340

(Continued)

FOREIGN PATENT DOCUMENTS

| JP | 2000056221 A | 2/2000 |
|---|---|---|
| JP | 2002-252796 A | 9/2002 |

(Continued)

*Primary Examiner* — Gevell V Selby
(74) *Attorney, Agent, or Firm* — W & C IP

(57) ABSTRACT

A method for assembling a camera device includes: preparing a lens group composed of a plurality of lenses each having an outer shape not having the area that is not used by an imaging element; sequentially inserting the plurality of lenses from above into a cylindrical holding member having a lens accommodating inner wall face conforming to the outer shape of the lens group and for holding the lens group inside the holding member; and in a state in which the upper face of the upper lens of the lens group provided at the upper end of the holding member is exposed, mounting a retainer having an opening on the upper end of the holding member so as to enclose the outer peripheral edge of the upper lens.

19 Claims, 48 Drawing Sheets

(56) References Cited

U.S. PATENT DOCUMENTS

| | | | | |
|---|---|---|---|---|
| 2010/0236063 | A1* | 9/2010 | Inagaki | H04N 5/2251 |
| | | | | 29/832 |
| 2011/0279675 | A1* | 11/2011 | Mano | H04N 5/2253 |
| | | | | 348/148 |
| 2013/0287383 | A1* | 10/2013 | Haruguchi | H04N 5/2257 |
| | | | | 396/133 |
| 2014/0168796 | A1 | 6/2014 | Mori et al. | |
| 2016/0154198 | A1* | 6/2016 | Alasimio | H04N 5/225 |
| | | | | 348/335 |

FOREIGN PATENT DOCUMENTS

| | | |
|---|---|---|
| JP | 2007-53144 A | 3/2007 |
| JP | 2008-177871 A | 7/2008 |
| JP | 2012-183925 A | 9/2012 |
| JP | 52108026 B2 | 3/2013 |
| JP | 2013-228610 A | 11/2013 |
| WO | 2012/039304 A1 | 3/2012 |
| WO | 2012/043195 A1 | 4/2012 |

\* cited by examiner

METHOD FOR ASSEMBLING CAMERA DEVICE AND METHOD FOR ASSEMBLING LENS UNIT

TECHNICAL FIELD

The present invention relates to a method for assembling a camera device, more particularly, to a method for assembling a vehicle-mounted camera for use as a back monitor camera at the rear section of a vehicle body and a method for assembling a lens unit for use in the vehicle-mounted camera.

BACKGROUND ART

This kind of vehicle-mounted camera, such as a back monitor camera, is mounted, for example, at the lower section of the spoiler of a vehicle body, the dent section around a number plate, at the upper section of a back door or on the surface of a flat back door. Since this kind of vehicle-mounted camera is mounted on the outside of the vehicle body, the camera is required to have waterproofness and dust-proofness. Various types of this kind of vehicle-mounted camera have been proposed conventionally.

For example, Patent Document 1 discloses a vehicle-mounted camera in which a front cover including a camera module and a rear cover are joined with screws. In the vehicle-mounted camera disclosed in Patent Document 1, the joint portions of the front cover and the rear cover are covered with a packing, thereby being sealed hermetically. In addition, in the vehicle-mounted camera disclosed in Patent Document 1, the camera section thereof is provided at the front end of the camera module.

Furthermore, Patent Document 2 discloses a vehicle-mounted camera in which a rear case and a front case being opposed to each other are firmly fastened with screws or the like to maintain waterproofness. In the vehicle-mounted camera disclosed in Patent Document 2, a first board on which an imaging element is mounted is fixed to the front case so that the center of the imaging element is aligned with the optical axis center and the focusing position of the lens. In other words, after an image obtained from an NTSC (National Television System Committee) signal is analyzed, the imaging element is moved to an optimal position, and the first board is fixed to the front case with adhesive or screws. The first board is connected to a second board by an inter-board connector. A harness connector for connection to a harness for receiving image signals and power supply from the outside is mounted on the second board.

Moreover, Patent Document 3 discloses an electric apparatus for a module apparatus that is used to connect a module apparatus, such as a vehicle-mounted monitor camera device, to an external apparatus. In Patent Document 3, the module apparatus is mounted on the electric apparatus. The module apparatus is composed of an imaging element and a camera lens mounted on a board. The connector of the module apparatus is connected to an internal-connection wire connector provided in the case body. The module apparatus is positioned and mounted inside a module apparatus accommodating section provided in the case body. The case cover is fixed to the case body by ultrasonic welding or the like, and the module apparatus is accommodated in the electric apparatus. The module apparatus accommodating section accommodating the module apparatus is covered with the case cover, whereby the interior formed between the case body and the case cover is hermetically sealed. The case body has an accommodating section partitioning wall to separate the module apparatus accommodating section from a connection opening for external connection. The accommodating section partitioning wall has a through hole. The internal-connection wire is bent at a substantially right angle and connected via the through hole to a relay cable at the connection opening. The through hole is sealed with adhesive resin. The connection opening is sealed with a secondary formed resin section that is formed by secondary molding.

Still further, Patent Document 4 discloses, instead of a vehicle-mounted camera, a zoom lens apparatus that is compact while being low in cost and simple in configuration. The zoom lens apparatus is equipped with a zoom lens system composed of a first lens group having positive power, a second lens group having negative power, and subsequent groups arranged in this order from the object side. The lens elements are held such that the outer peripheral sections thereof are fitted and fixed inside a holding cylinder. The light receiving face of a solid-state imaging element, such as a CCD (Charge Coupled Device), generally has a rectangular shape. Hence, Patent Document 4 describes that no problem occurs even if the outer peripheral portions of the lens corresponding to the upper and lower portions of the long sides are cut off so that the length of the first lens group in the Y-direction (the short-side direction of the CCD) becomes short. Each of the lens elements constituting the first lens group has an outer peripheral face having a shape obtained by cutting part of a cylindrical face having a generating line parallel to the optical axis along planes parallel to the optical axis. Each of the lens elements constituting the first lens group is held on its outer peripheral face except for the cut portion of the cylindrical face.

What's more, Patent Document 4 describes that the outer peripheral portions of the lens corresponding to the left and right portions of the short sides of the CCD may be cut so that the length of the first lens group in the X-direction (the long-side direction of the CCD) becomes short. As a result, it is possible to obtain a rectangular lens, the outer peripheral portions of which are cut along four planes so as to conform to the screen format of the CCD.

PRIOR ART DOCUMENT

Patent Document

Patent Document 1: JP-A-2012-183925
Patent Document 2: Japanese Patent No. 5218026
Patent Document 3: JP-A-2008-177871
Patent Document 4: JP-A-2000-56221

GENERAL DESCRIPTION OF THE INVENTION

Problem that the Invention is to Solve

The above-mentioned Patent Documents 1 to 4 respectively have the following problems.

In the vehicle-mounted camera disclosed in Patent Document 1, the camera module is covered with the front cover and the rear cover joined with screws. Furthermore, the joint portions of the front cover and the rear cover are covered with the packing. Hence, the vehicle-mounted camera according to Patent Document 1 has a problem that the number of components is large. Moreover, in Patent Document 1, the lens section is mounted at the front end of the camera module. In Patent Document 1, the configurations of the lens section and the camera module are not described in detail. The lens section is generally composed of a lens (lens group) and a barrel serving as a component for light-shielding the lens (lens group). Hence, the camera module is used to hold the barrel. Consequently, in the vehicle-mounted camera according to Patent Document 1, the lens (lens group) is triply covered with the barrel, the camera module and the front cover. As a result, the vehicle-mounted camera according to Patent Document 1 has a problem that the number of components is large and the external dimensions of the camera also become large.

As described above, since the vehicle-mounted camera disclosed in Patent Document 1 is composed of a large number of components, it takes time and effort to assemble the camera.

Also in the vehicle-mounted camera disclosed in Patent Document 2, the rear case and the front case opposed to each other are firmly fixed with screws or the like. Furthermore, in the vehicle-mounted camera according to Patent Document 2, the harness connector is mounted on the second board. Hence, the vehicle-mounted camera disclosed in Patent Document 2 also has a problem that the number of components is large.

As a result, since the vehicle-mounted camera disclosed in Patent Document 2 is also composed of a large number of components, it takes time and effort to assemble the camera.

In the module apparatus disclosed in Patent Document 3, the camera lens is mounted on the board. Patent Document 3 describes nothing about detailed configuration of the camera lens. However, it is assumed that the camera lens is composed of a lens (lens group), a component (barrel) for light-shielding the lens (lens group), and a component (holding component) for holding the barrel in order to mount the camera lens on the board. In other words, it is assumed that the module apparatus according to Patent Document 3 is equivalent (correspondent) to the camera module according to Patent Document 1 described above. Hence, as in Patent Document 1, in the electric apparatus for the module apparatus according to Patent Document 3, the lens (lens group) is triply covered with the barrel, the holding component and the case body. As a result, the electric apparatus for the module apparatus according to Patent Document 3 has a problem that the number of components is large and the external dimensions of the apparatus also become large.

As a result, since the electric apparatus for the module apparatus disclosed in Patent Document 3 is also composed of a large number of components, it takes time and effort to assemble the apparatus.

On the other hand, Patent Document 4 describes the rectangular lens, the outer peripheral portions of which are cut along four planes so as to conform to the screen format of the CCD. However, Patent Document 4 simply describes that "the outer peripheral sections of the lens elements are fitted and fixed into a holding cylinder, thereby being held therein." Hence, Patent Document 4 does not specifically describe how the lens elements are held in the holding cylinder. In other words, Patent Document 4 does not disclose at all how the zoom lens apparatus is assembled specifically.

Hence, an object of the present invention is to provide a method for assembling a camera device and a method for assembling a lens unit for use in the camera device, capable of easily assembling a camera device using a small number of components.

Other objects of the present invention will become clear as the description proceeds.

In the descriptions of the present invention, the terms: upward, upper end, upper section and upper face, designate the side of the subject in the direction of the optical axis O of the camera device according to the present invention, and the terms: downward, lower end, lower section and lower face, designate the side of the imaging element in the direction of the optical axis O of the camera device according to the present invention.

Means for Solving the Problem

With a first exemplary embodiment according to the present invention, it is possible to obtain a method for assembling a camera device including a lens group preparing step for preparing a lens group composed of a plurality of lenses each having an outer shape not having the area that is not used by an imaging element; a lens group holding step for sequentially inserting the plurality of lenses from above into a cylindrical holding member having a lens accommodating inner wall face conforming to the outer shape of the lens group and for holding the lens group inside the holding member; and a retainer mounting step, in a state in which the upper face of the upper lens of the lens group provided at the upper end of the holding member is exposed, for mounting a retainer having an opening on the upper end of the holding member so as to enclose the outer peripheral edge of the upper lens.

With a second exemplary embodiment according to the present invention, it is possible to obtain a method for assembling a lens unit for use in a camera device including a lens group preparing step for preparing a lens group composed of a plurality of lenses each having an outer shape not having the area that is not used by an imaging element; a lens group holding step for sequentially inserting the plurality of lenses from above into a cylindrical holding member having a lens accommodating inner wall face conforming to the outer shape of the lens group and for holding the lens group inside the holding member; and a retainer mounting step, in a state in which the upper face of the upper lens of the lens group provided at the upper end of the holding member is exposed, for mounting a retainer having an opening on the upper end of the holding member so as to enclose the outer peripheral edge of the upper lens.

Advantage of the Invention

With the present invention, a camera device can be assembled easily using a small number of components.

BRIEF DESCRIPTION OF THE DRAWINGS

FIG. 40A is a perspective view showing the automobile AM as viewed from the rear side, and FIG. 40B is a front view showing the automobile AM as viewed from the front side.

MODE FOR CARRYING OUT THE INVENTION

First Embodiment

The structure of a camera device 10 according to a first embodiment of the present invention will be described referring to FIGS. 1 to 4. The camera device 10 shown in the figures is formed of a vehicle-mounted camera for use as a back monitor camera provided at the rear section of a vehicle body as described later. The camera device 10 may be a vehicle-mounted camera for use as a camera, such as a front monitor camera provided at the front section of the vehicle body.

Figure 1:
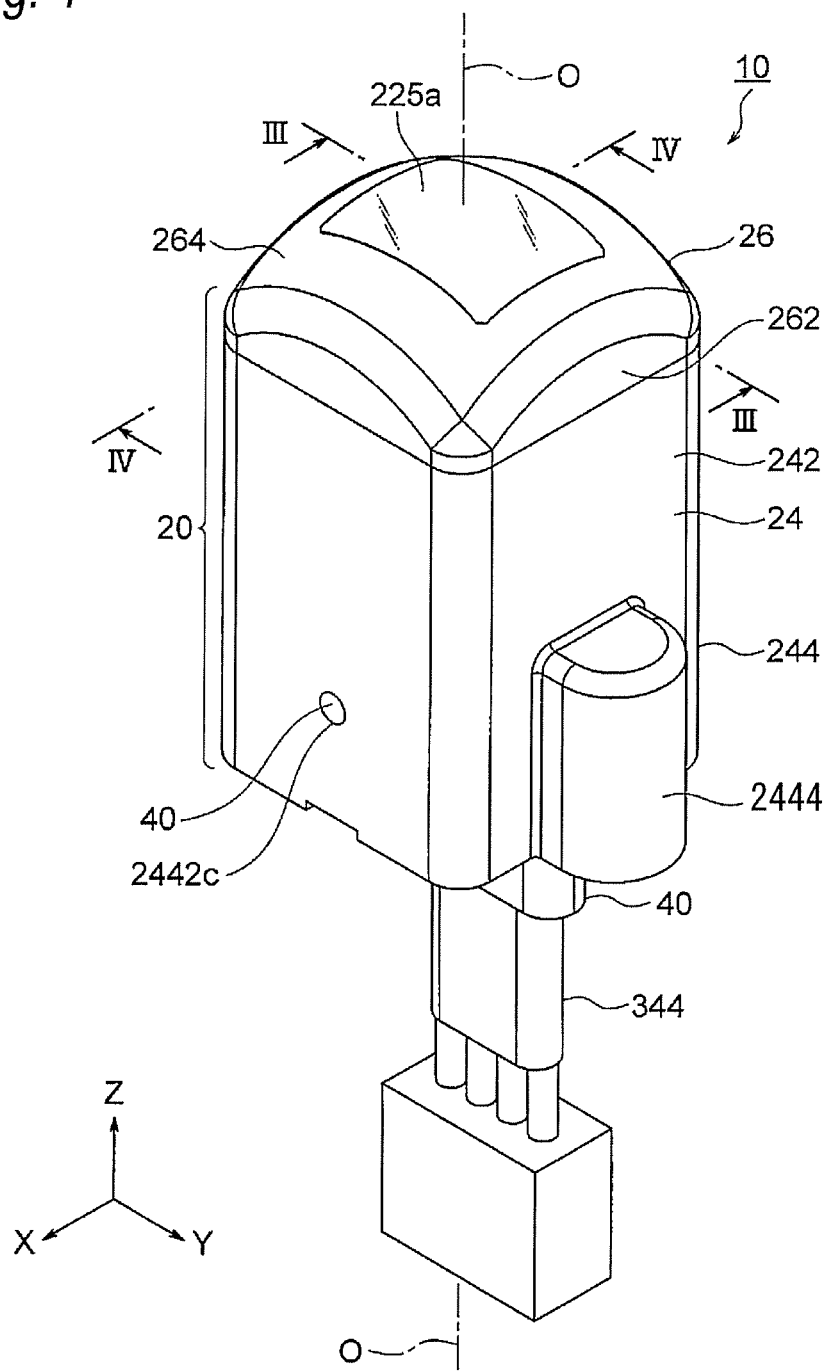
FIG. 1 is an external perspective view showing a camera device according to a first embodiment of the present invention.
Figure 2:
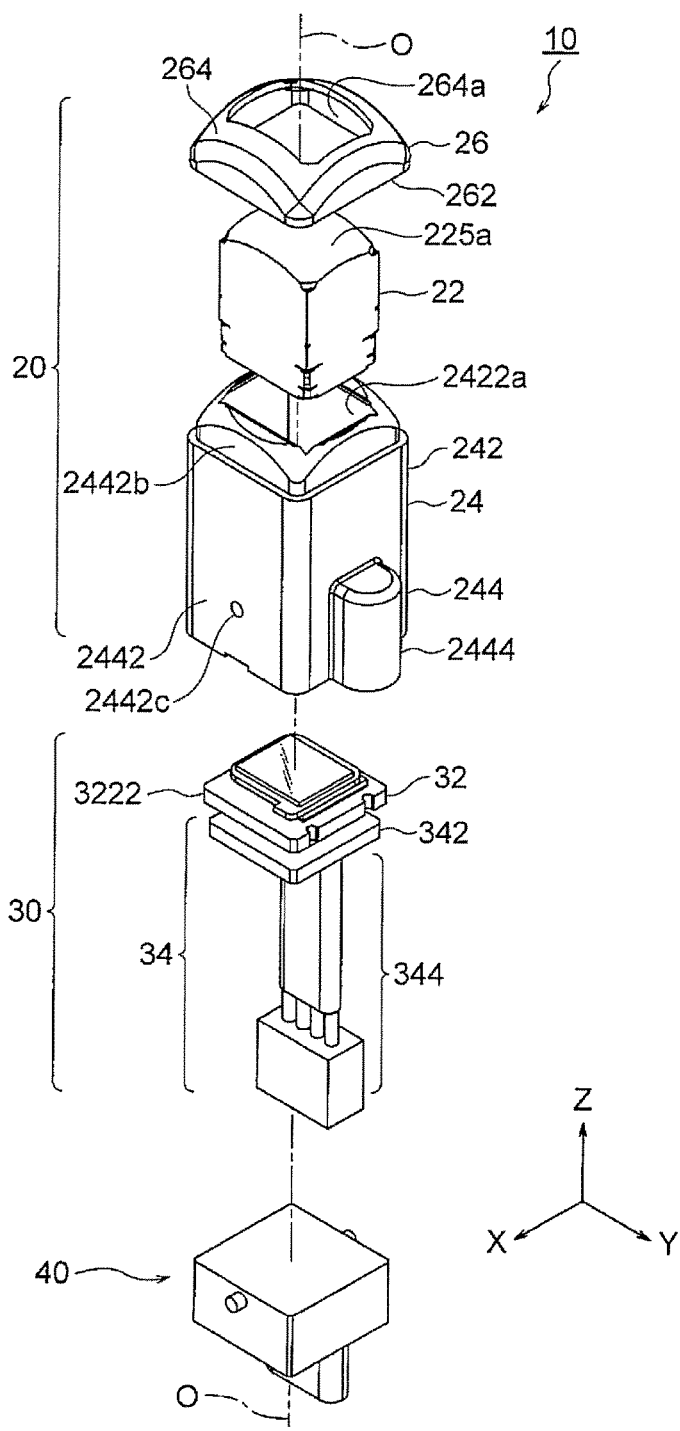
FIG. 2 is an exploded perspective view showing the camera device shown in FIG. 1.
Figure 3:
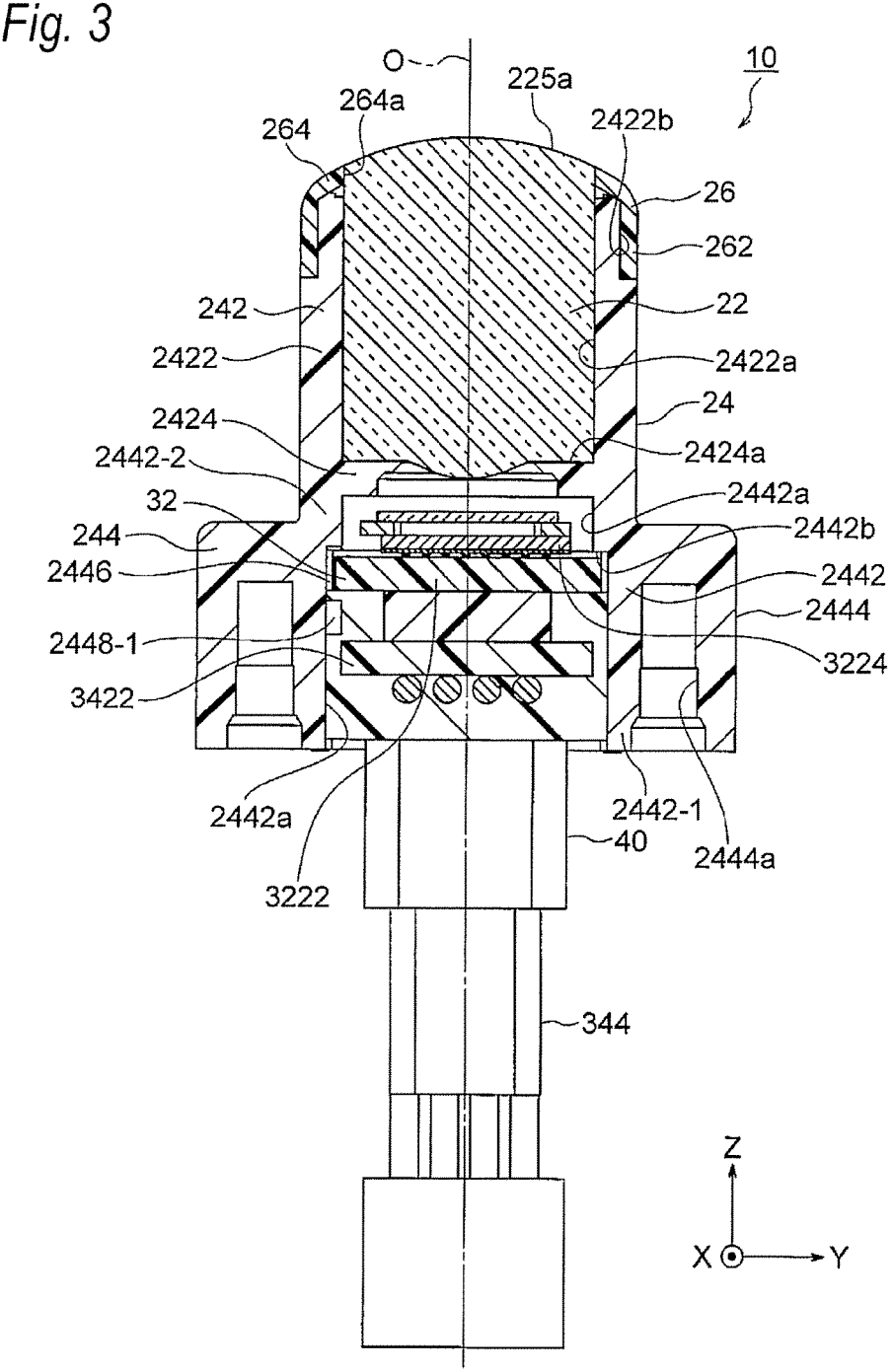
FIG. 3 is a vertical sectional view taken on line of FIG. 1.
Figure 4:
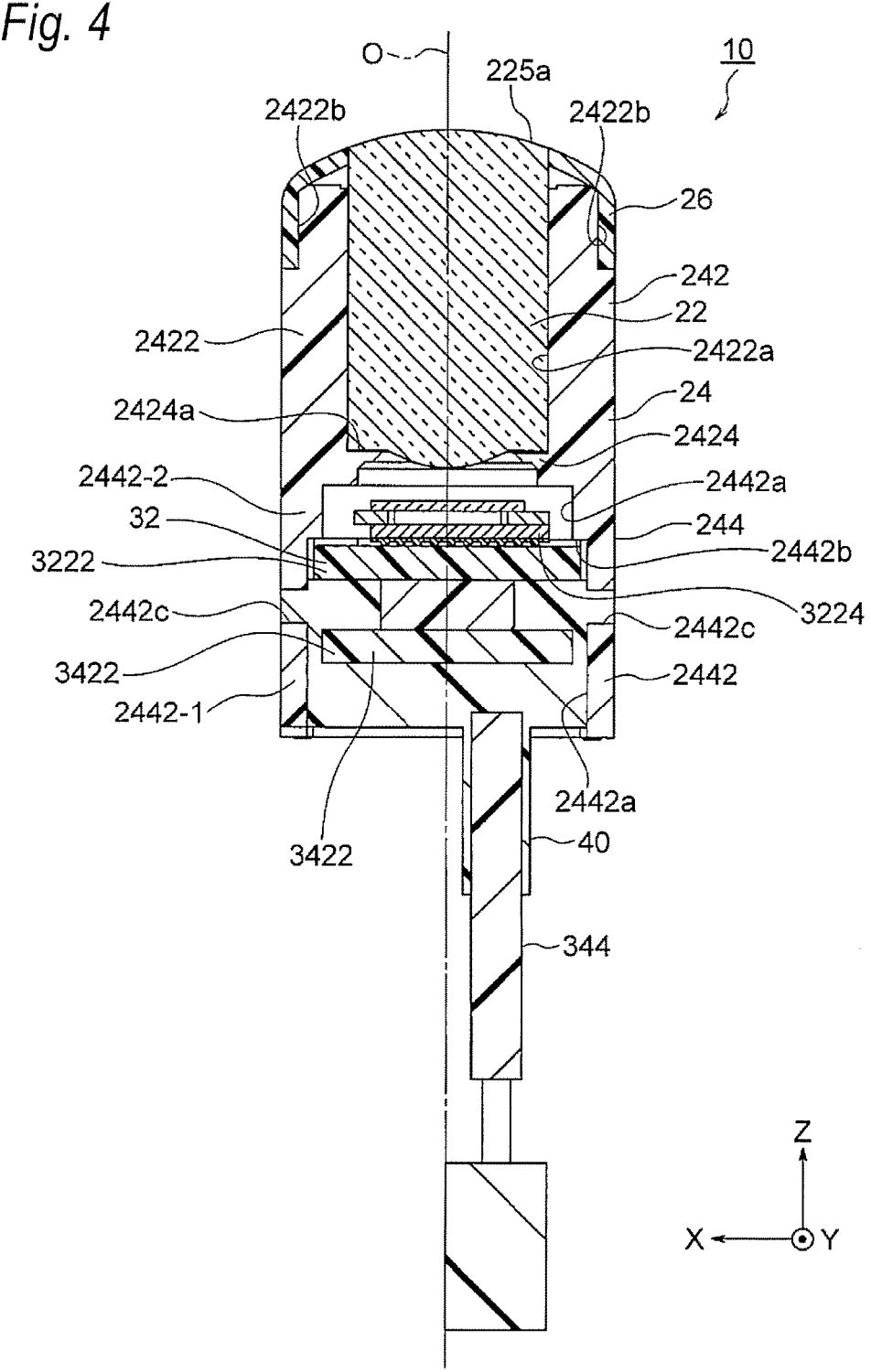
FIG. 4 is a vertical sectional view taken on line IV-IV of FIG. 1.

FIG. 1 is an external perspective view showing the camera device 10. FIG. 2 is an exploded perspective view showing the camera device 10. FIG. 3 is a vertical sectional view taken on line of FIG. 1. FIG. 4 is a vertical sectional view taken on line IV-IV of FIG. 1.

An orthogonal coordinate system (X, Y, Z) is herein used as shown in FIGS. 1 to 4. In the states shown in FIGS. 1 to 4, in the orthogonal coordinate system (X, Y, Z), the X-axis direction is the front-rear direction (depth direction), the Y-axis direction is the left-right direction (width direction), and the Z-axis direction is the up-down direction (height direction). Furthermore, in the example shown in FIGS. 1 to 4, the up-down direction Z is the direction of the optical axis O of the lens. In the example shown in the figures, the upward direction in the up-down direction Z is the direction where a subject (not shown) is present. In the first embodiment, the Y-axis direction (left-right direction) is also referred to as a first direction and the X-axis direction (left-right direction) is also referred to as a second direction.

The camera device 10 shown in the figures is mainly composed of three components as shown in FIG. 2. In other words, the camera device 10 is composed of a lens unit 20, a board unit 30 and a sealing member 40. "Sealing" herein means to close an opening. Furthermore, in the example shown in the figure, the board constituting the board unit 30 is formed of a printed wiring board (PWB). Hence, the board unit 30 is also referred to as a PWB unit.

The lens unit 20 is composed of a lens group 22, a holding member 24 for holding this lens group 22, and a retainer 26 for preventing water from entering the interior of this holding member 24.

The lens group 22 composed of a plurality of lenses (described later). In the example shown in the figures, the lens group 22 is composed of five lenses. Each of the five lenses has an outer shape not having the area that is not used by an imaging element 3224 described later. In the example shown in the figures, the outer shape of the five lenses is a rectangular shape corresponding to the outer shape of the imaging element 3224.

The holding member 24 shown in the figures includes a barrel section 242 for light-shielding the lens group 22 and a bracket section 244 for mounting the camera device 10 on another apparatus, such as a vehicle body, and has a structure in which the barrel section 242 and the bracket section 244 are integrated. The holding member 24 is made of resin.

The barrel section 242 of the holding member 24 has a cylindrical section 2422 having a substantially square cylindrical shape and extending in the up-down direction Z. The cylindrical section 2422 has a lens accommodating inner wall face 2422a conforming to the outer shape of the lens group 22. Furthermore, the barrel section 242 has, at its lower end section, a rectangular ring-shaped engaging section 2424 protruding inward in the radial direction from the lens accommodating inner wall face 2422a of the cylindrical section 2422 so as to engage with the lower lens (described later) on the lowermost side of the lens group 22. The engaging section 2424 has an engaging face 2424a on its upper face. "Engaging" herein means to perform engagement and locking. A lens accommodating space LS for accommodating the lens group 22 is defined by the combination of the lens accommodating inner wall face 2422a of the cylindrical section 2422 and the engaging face 2424a of the engagement section 2424.

Moreover, the cylindrical section 2422 of the barrel section 242 has, at its upper end section, retainer receiving face 2422b recessed inward in the radial direction from the outer wall of the cylindrical section 2422 of the barrel section 242 to receive the retainer 26.

As described later, a plurality of lenses constituting the lens group 22 is sequentially inserted into the barrel section 242 of the holding member 24 from above and accommodated and held in the lens accommodating space LS of the barrel section 242.

The bracket section 244 of the holding member 24 has a cylindrical section 2442 having a square cylindrical shape and provided so as to be continuously extended downward from the cylindrical section 2422 of the barrel section 242 and a pair of screw holding sections 2444 provided so as to protrude outward in the left-right direction Y from this cylindrical section 2442. Each of the screw holding sections

2444 has a semi-cylindrical outer shape and has a screw insertion hole 2444a bored in the up-down direction Z. "Boring" herein means to form a hole.

The retainer 26 is mounted on the upper end of the cylindrical section 2422 of the barrel section 242 of the holding member 24 as described later. The retainer 26 is composed of an outer cylindrical section 262 having a substantially square cylindrical shape and extended in the up-down direction Z and an upper end section 264 having a curved ring shape and provided at the upper end of this outer cylindrical section 262 so as to protrude obliquely upward and inward from the outer cylindrical section 262. The upper end section 264 has an opening 264a having a substantially square shape conforming to the outer shape of the above-mentioned lens group 22.

The outer cylindrical section 262 of the retainer 26 is received by the retainer receiving face 2422b of the cylindrical section 2422 of the barrel section 242. What's more, the upper face 225a of the upper lens (described later) on the uppermost side of the lens group 22 is exposed from the opening 264a of the upper end section 264 of the retainer 26 as described later. In other words, the retainer 26 is mounted on the barrel section 242 of the holding member 24 so as to enclose the outer peripheral edge of the upper lens in a state in which the upper face 225a of the upper lens is exposed.

In the bracket section 244 of the holding member 24, the inner wall face of the cylindrical section 2442 communicates with the above-mentioned lens accommodating inner wall face 2422a via the engagement section 2424 and serves as a board accommodating inner wall face 2442a for accommodating the board module of the board unit 30 described later. The cylindrical section 2442 is composed of a lower cylindrical section 2442-1 having an accommodation space being large in width (diameter) and an upper cylindrical section 2442-2 having an accommodation space being small in width (diameter) and continuing to the lower cylindrical section 2442-1. The step between the lower cylindrical section 2442-1 and the upper cylindrical section 2442-2 is used as a board mounting face 2442b for mounting the sensor board 3222 of the sensor board unit 32 of the board unit 30 described later. A board accommodating space SS for accommodating the board module of the board unit 30 is defined by the combination of the board accommodating inner wall face 2442a and the board mounting face 2442b.

Furthermore, in the bracket section 244 of the holding member 24, the cylindrical section 2442 has a pair of air vent holes 2442c for discharging the air inside the board accommodating space SS of the bracket section 244 to the outside when the board accommodating space SS is filled with hot melt adhesive as described later. In the example shown in the figures, the pair of air vent holes 2442c is bored at the central sections of a pair of side faces of the cylindrical section 2442 opposed to each other in the front-rear direction X.

The board unit 30 is composed of the sensor board unit 32 and a power source board unit 34. The sensor board unit 32 is also referred to as a sensor PWB unit and the power source board unit 34 is also referred to as a power source PWB unit.

The sensor board unit 32 includes the imaging element (described later); the detailed configuration thereof will be described later.

The power source board unit 34 includes a power source board assembly 342 and a harness assembly 344; the detailed configuration thereof will be described later. The power source board assembly 342 is also referred to as a power source PWB assembly.

The sealing member 40 seals the lower section of the holding member 24 as described later.

Next, a method for assembling the lens unit 20 will be described referring to FIGS. 5 to 14.

Figure 5:
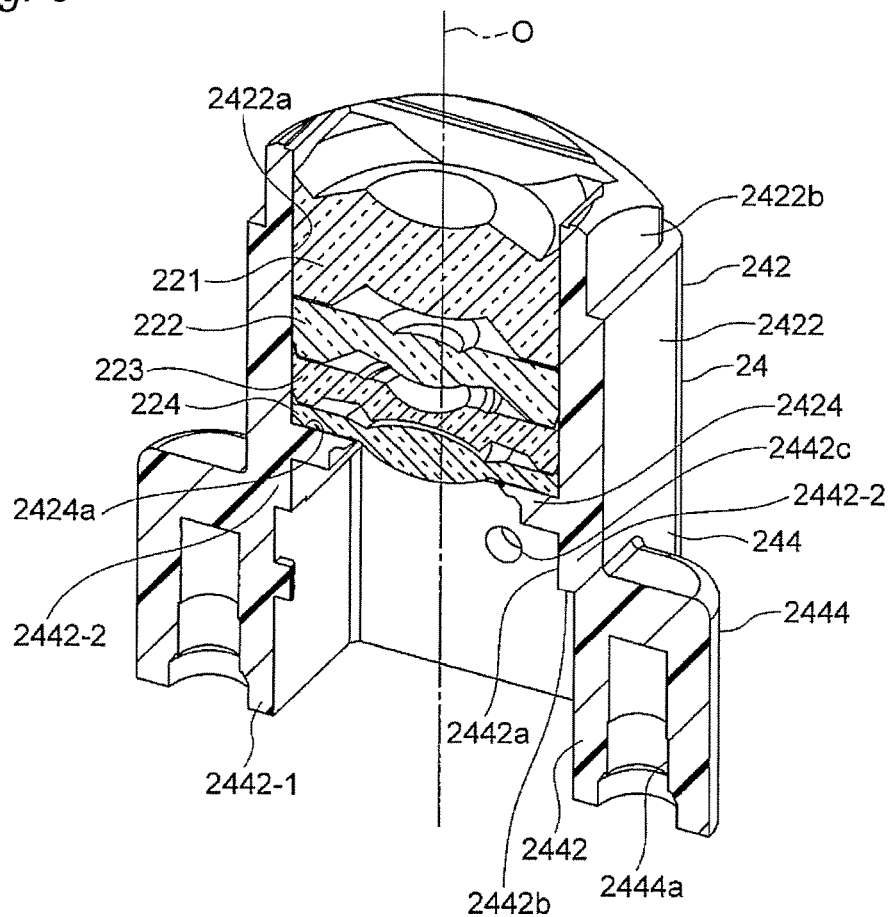
FIG. 5 is a vertical sectional perspective view showing a lens unit for use in the camera device shown in FIG. 1 being assembled.

FIG. 5 is a vertical sectional perspective view showing the lens unit 20 being assembled. The lens group 22 is composed of a plastic lens group consisting of the first to fourth lenses 221, 222, 223 and 224 and a glass lens formed of a fifth lens 225 (see FIG. 11) as shown in FIG. 5. The first to fourth lenses 221 to 224 are also referred to as first to fourth plastic lenses, respectively.

Since the fourth plastic lens 224 is provided at the lowermost section of the lens group 22, the lens is referred to as a lower lens. On the other hand, since the fifth lens 225 is provided at the uppermost section of the lens group 22, the lens is referred to as an upper lens.

First, the plastic lens group (221 to 224) of the lens group 22 are lightly press-fitted into the barrel section 242 of the holding member 24 as shown in FIG. 5.

Figure 6:
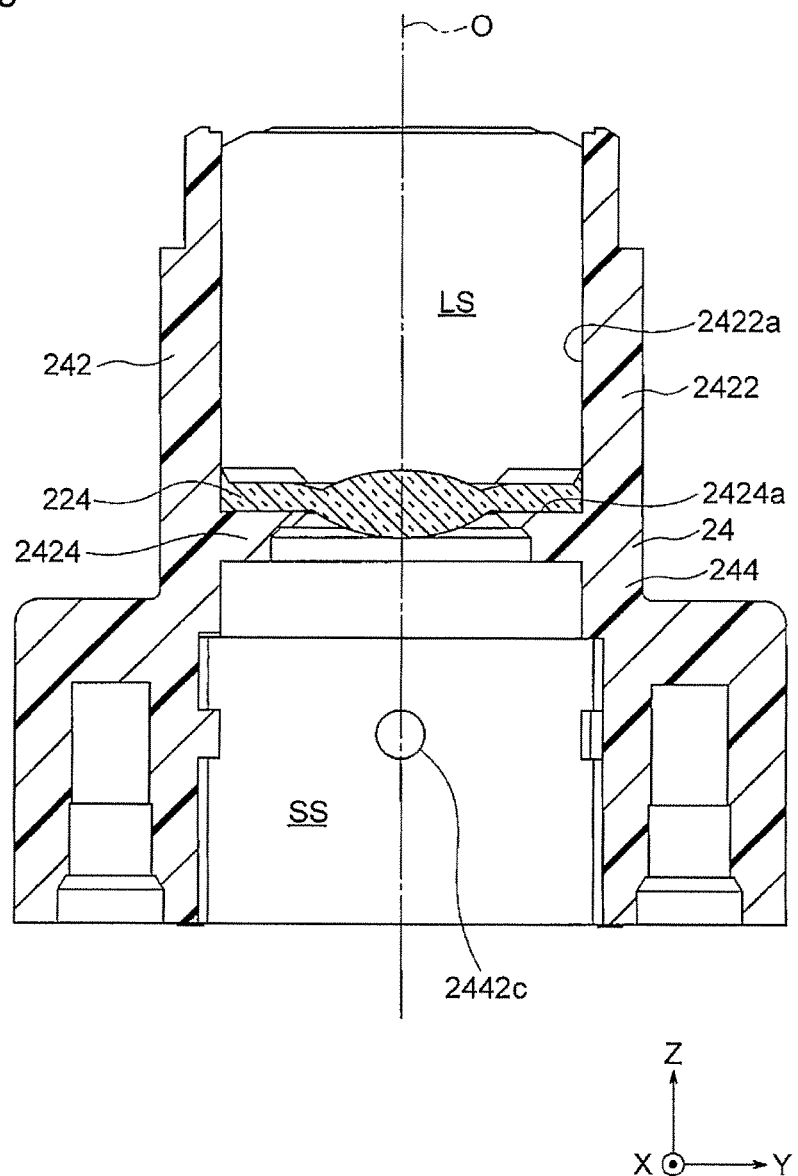
FIG. 6 is a vertical sectional view showing a state in which a fourth plastic lens (lower lens) has been press-fitted into a barrel section from above.

More specifically, the fourth plastic lens (lower lens) 224 is press-fitted into the barrel section 242 from above as shown in FIG. 6. At this time, the lower face of the fourth plastic lens 224 is engaged with the engaging face 2424a of the engagement section 2424 of the barrel section 242. As a result, the fourth plastic lens 224 is positioned at its regular position inside the lens accommodating space LS of the barrel section 242.

Figure 7:
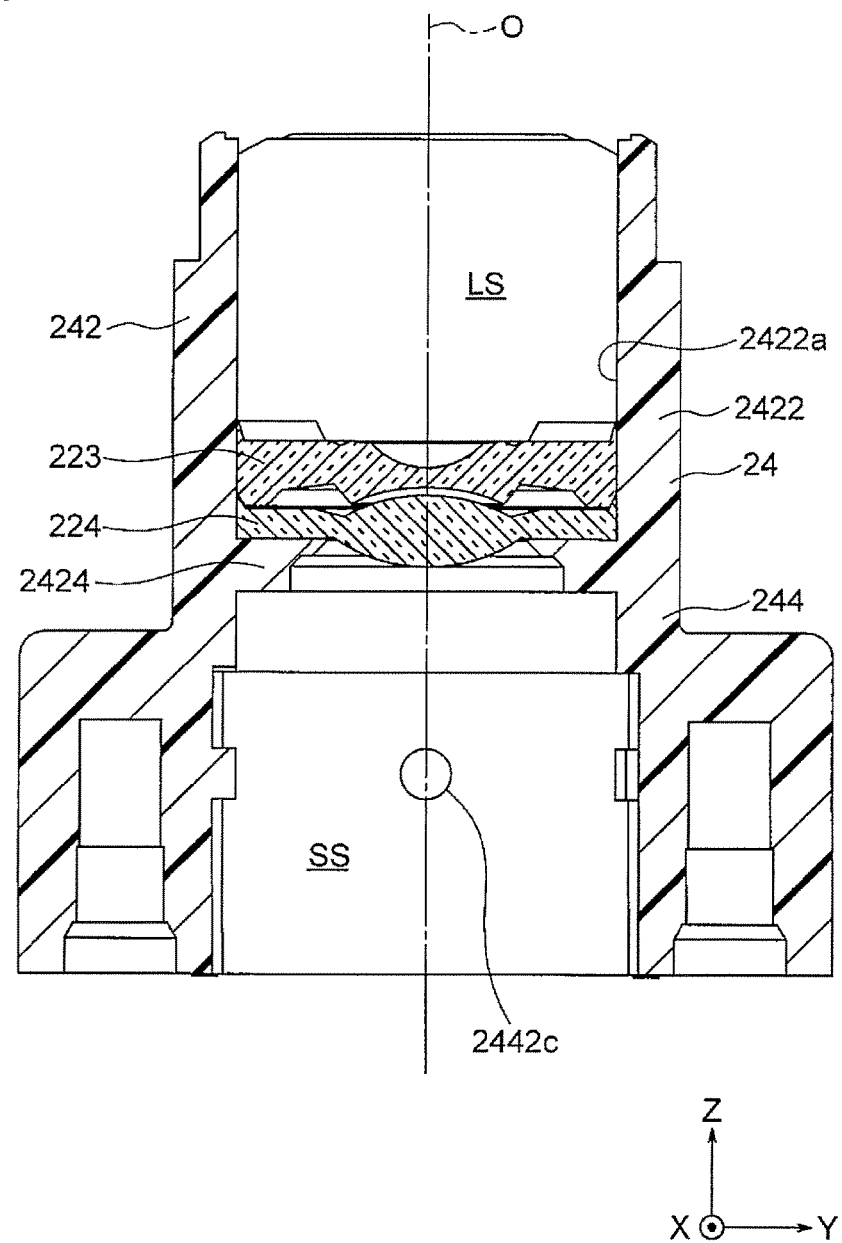
FIG. 7 is a vertical sectional view showing a state in which a third plastic lens has been press-fitted into the barrel section from above.

Next, the third plastic lens 223 is press-fitted into the barrel section 242 from above as shown in FIG. 7. Hence, the lower face of the third plastic lens 223 and the upper face of the fourth plastic lens 224 make abutting contact with each other. "Making abutting contact" herein means to make contact in an abutted state. As a result, the third plastic lens 223 is also positioned at its regular position inside the lens accommodating space LS of the barrel section 242.

Figure 8:
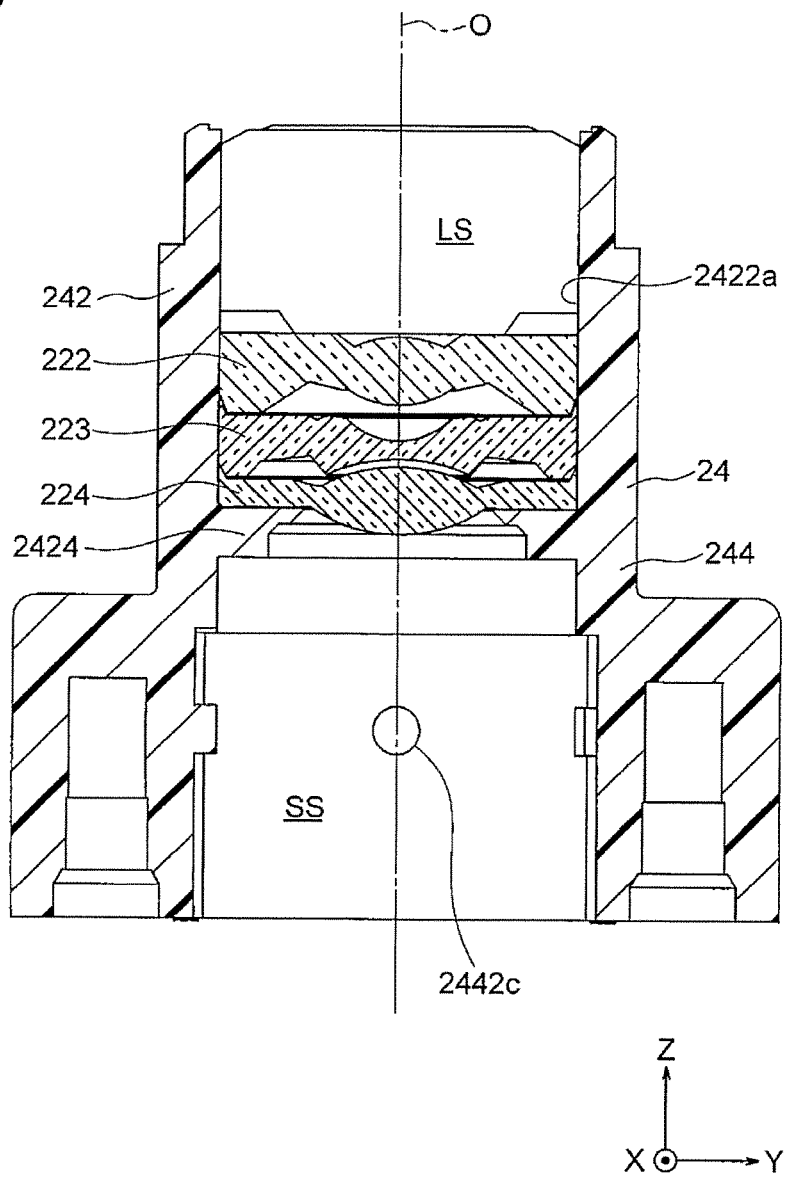
FIG. 8 is a vertical sectional view showing a state in which a second plastic lens has been press-fitted into the barrel section from above.

After that, the second plastic lens 222 is press-fitted into the barrel section 242 from above as shown in FIG. 8. Hence, the lower face of the second plastic lens 222 and the upper face of the third plastic lens 223 make abutting contact with each other. As a result, the second plastic lens 222 is also positioned at its regular position inside the lens accommodating space LS of the barrel section 242.

Figure 9:
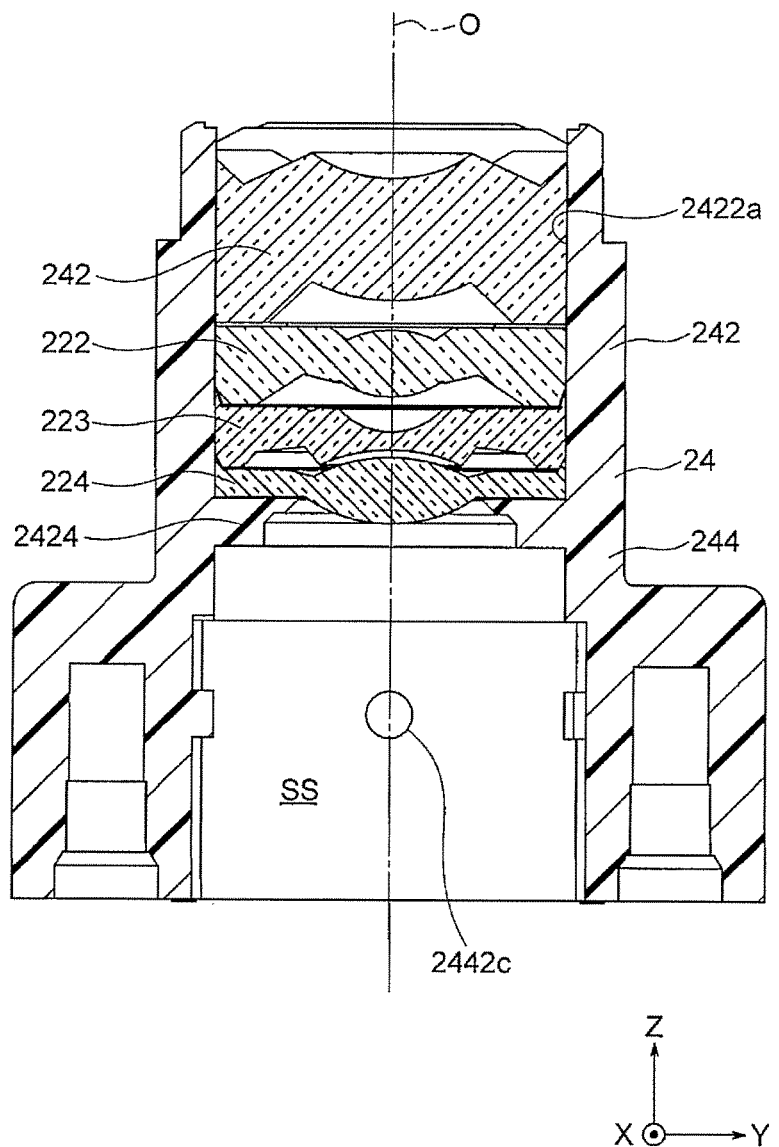
FIG. 9 is a vertical sectional view showing a state in which a first plastic lens has been press-fitted into the barrel section from above.

And then, the first plastic lens 221 is press-fitted into the barrel section 242 from above as shown in FIG. 9. Hence, the lower face of the first plastic lens 221 and the upper face of the second plastic lens 222 make abutting contact with each other. As a result, the first plastic lens 221 is also positioned at its regular position inside the lens accommodating space LS of the barrel section 242.

Figure 10:
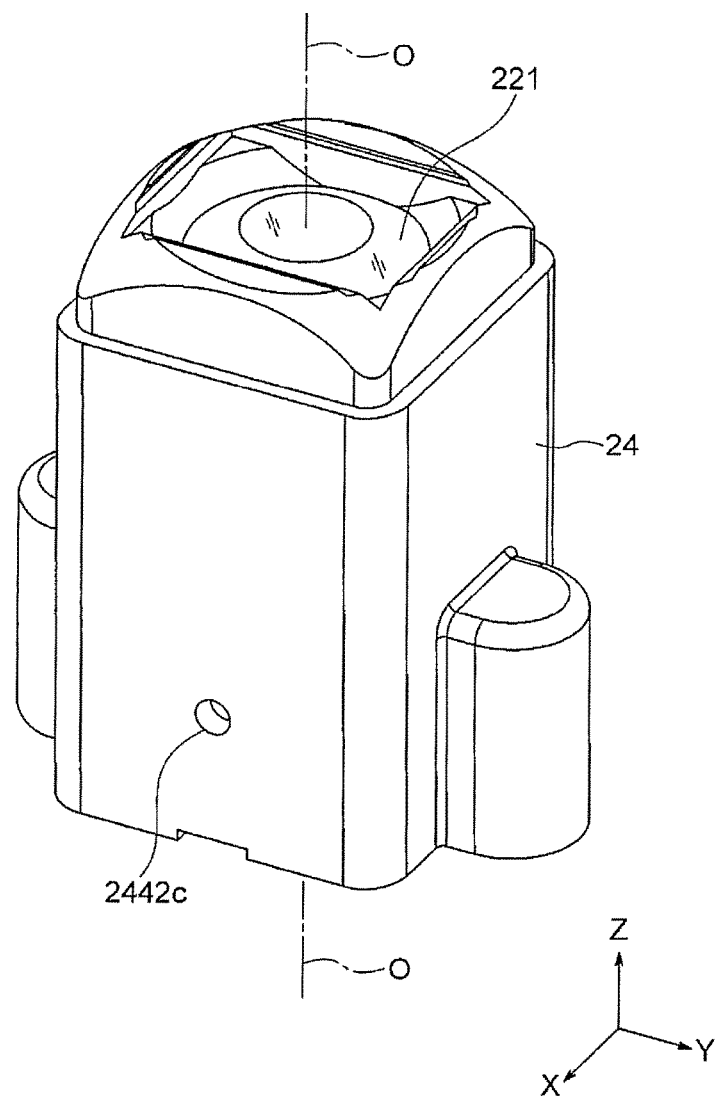
FIG. 10 is a perspective view showing the state in FIG. 5 in which the plastic lens group has been press-fitted into the barrel section of a holding member.

FIG. 10 is a perspective view showing a state in which the plastic lens group consisting of the first to fourth lenses 221 to 224 has been slightly press-fitted as described above.

Figure 11:
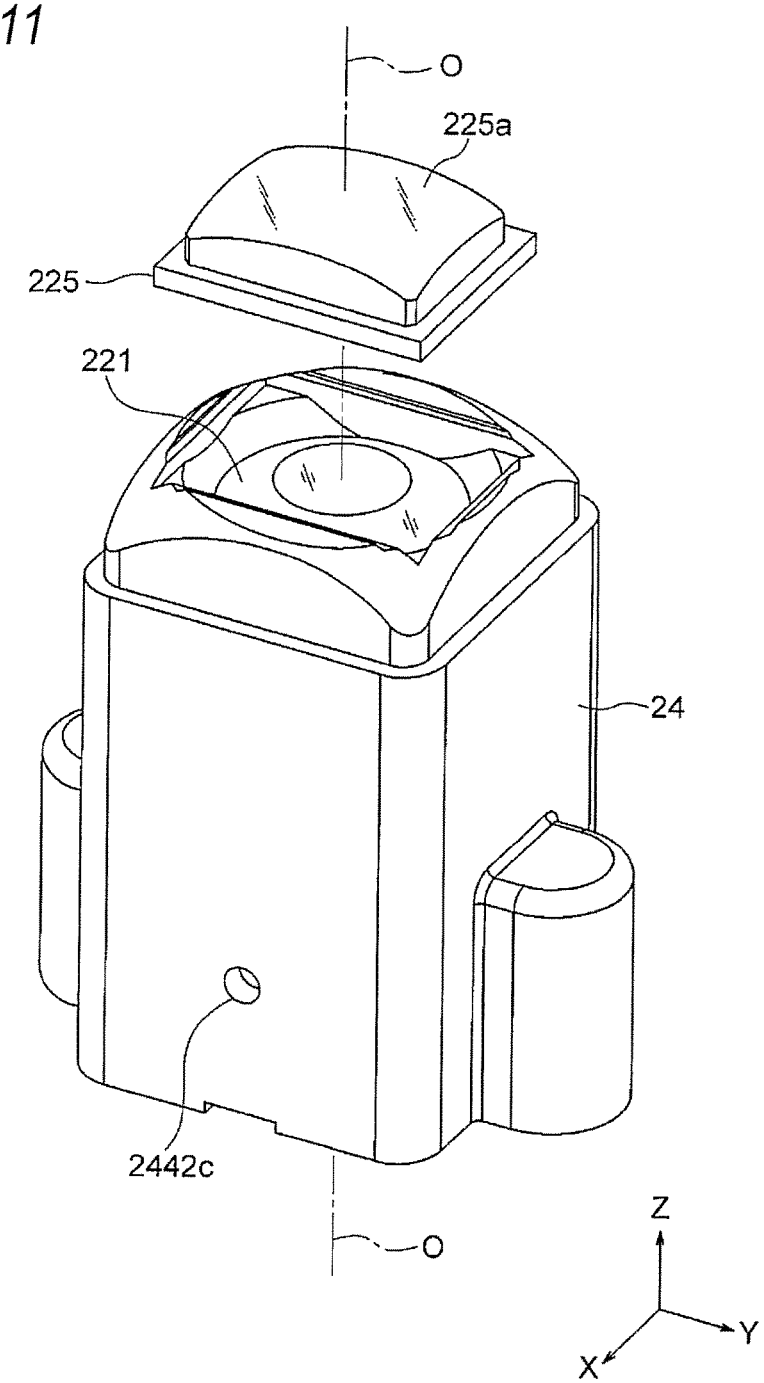
FIG. 11 is an exploded perspective view showing a state in which a glass lens serving as a fifth lens (upper lens) is being mounted on the first plastic lens.

Then, the glass lens, that is, the fifth lens 225 (upper lens) 225, is placed on the first plastic lens 221 as shown in FIG. 11.

Figure 12:
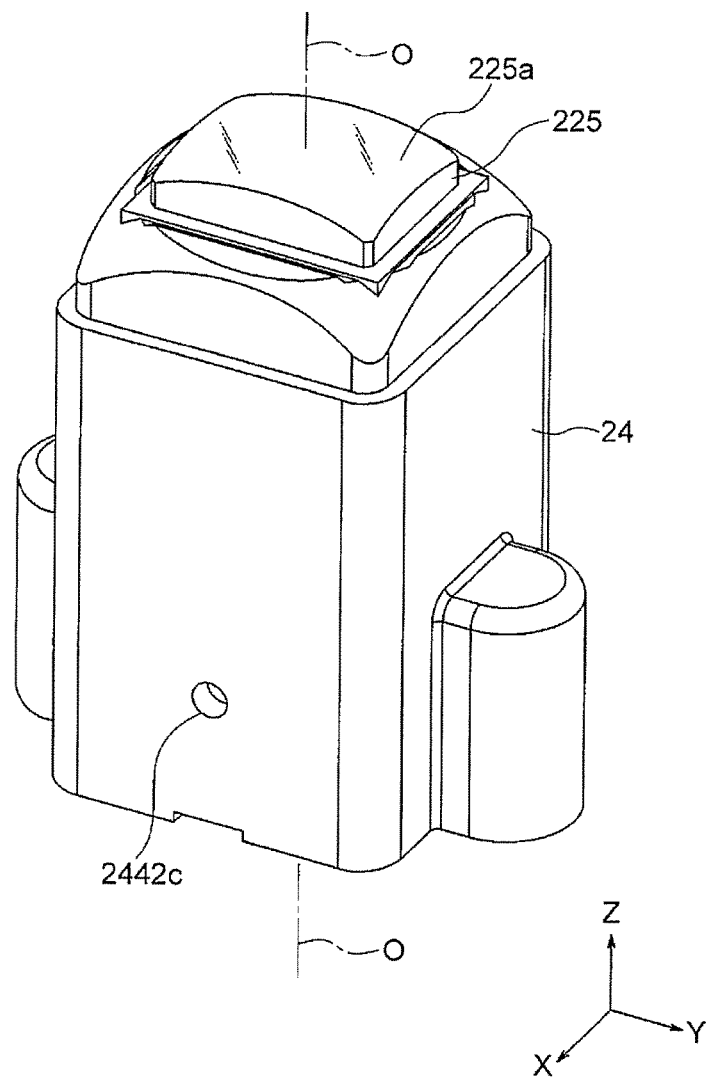
FIG. 12 is a perspective view showing a state in which the glass lens serving as the fifth lens (upper lens) has been mounted on the first plastic lens.

Hence, the lower face of the fifth lens 225 and the upper face of the first plastic lens 221 make abutting contact with each other as shown in FIG. 12. As a result, the fifth lens 225 is also positioned at its regular position inside the lens accommodating space LS of the barrel section 242.

After that, in FIG. 12, adhesive (not shown) is applied to the outer periphery of the fifth lens 225 (upper lens).

Figure 13:
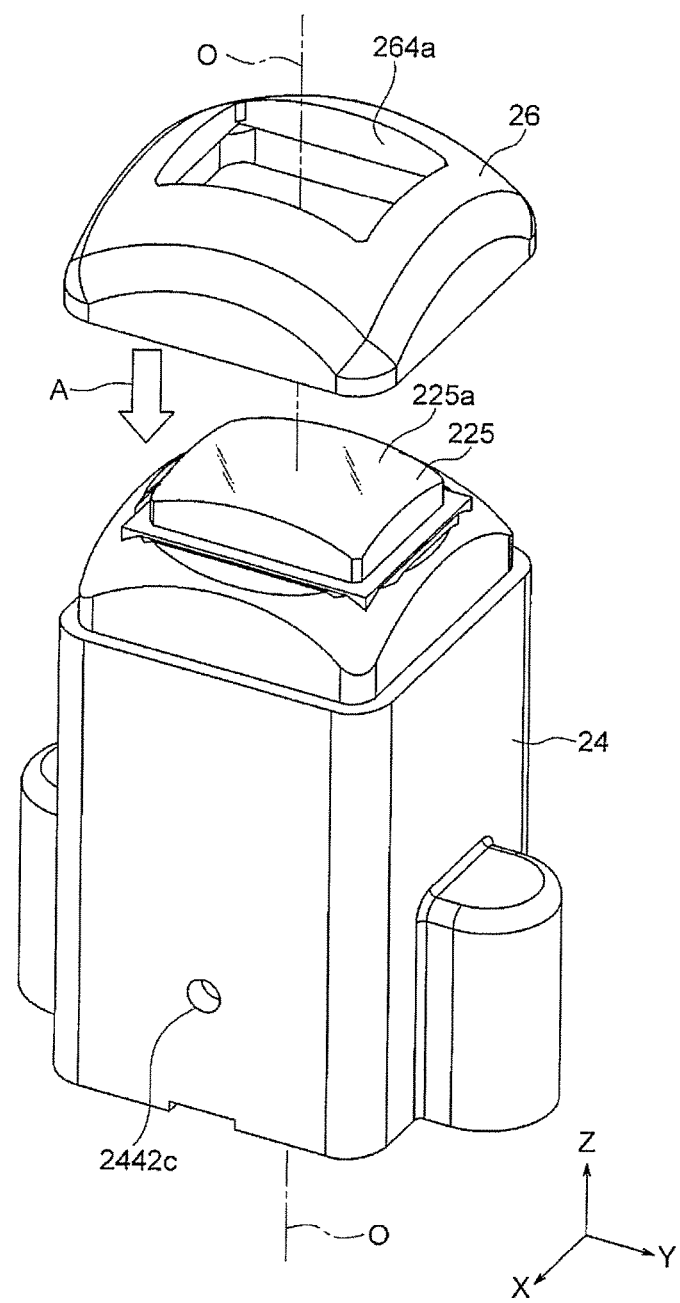
FIG. 13 is an exploded perspective view showing a state in which a retainer is being placed to cover the upper face of the holding member from above and bonded with adhesive.

Then, the retainer 26 is placed to cover the upper end of the holding member 24 from above as indicated by a hollow arrow A as shown in FIG. 13 and bonded with the adhesive.

Figure 14:
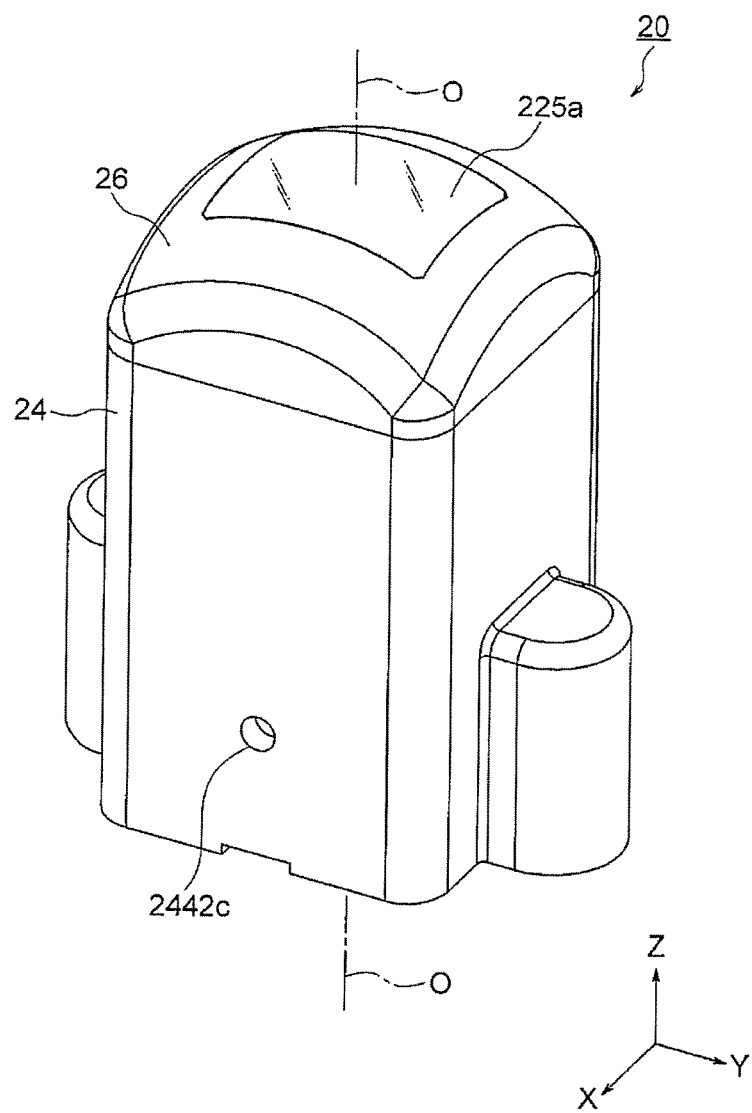
FIG. 14 is a perspective view showing a state in which the retainer has been fixed to the holding member by thermosetting in an oven.

In the end, the retainer 26 is fixed to the holding member 24 by thermosetting in an oven as shown in FIG. 14. At this time, the upper face 225a of the fifth lens (upper lens) 225 is exposed from the opening 264a of the retainer 26. In this way, the lens unit 20 is assembled.

Summarizing the above descriptions, the method for assembling the lens unit 20 includes a lens group preparing step for preparing a lens group (22) composed of a plurality of lenses (221 to 225) each having an outer shape not having the area that is not used by an imaging element (3224); a lens group holding step for sequentially inserting the plurality of lenses (221 to 225) from above into a cylindrical holding member (24) having a lens accommodating inner wall face (2422a) conforming to the outer shape of the lens group (22) and for holding the lens group (22) inside the holding member (24); and a retainer mounting step, in a state in which the upper face (255a) of the upper lens (225) of the lens group (22) provided at the upper end of the holding member (24) is exposed, for mounting a retainer (26) having an opening (264a) on the upper end of the holding member (24) so as to enclose the outer peripheral edge of the upper lens (225) in order to prevent water from entering the interior of this holding member (24).

Next, the configuration of the sensor board unit 32 and a method for assembling the sensor board unit will be described referring to FIGS. 15 to 19.

Figure 19:
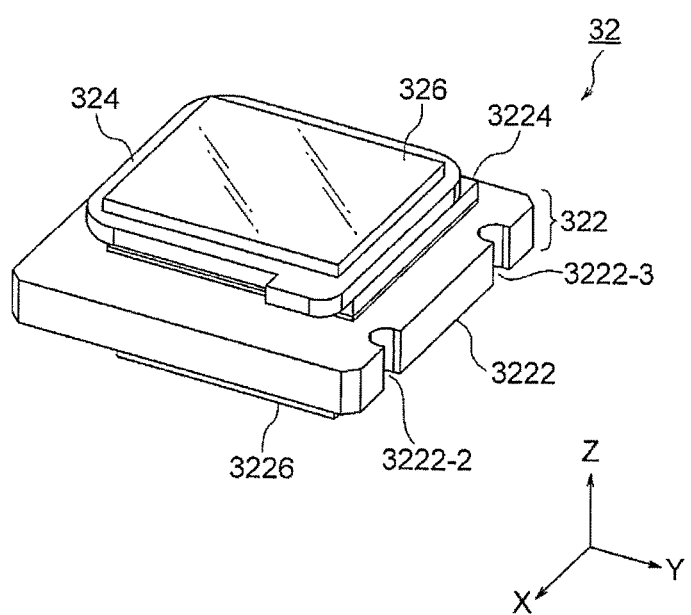
FIG. 19 is a perspective view showing a sensor board unit for use in the camera device shown in FIG. 1.

The sensor board unit 32 is composed of a sensor board assembly 322, adhesive tape 324 and an infrared ray cut filter (IRCF) 326 as shown in FIG. 19. The sensor board assembly 322 is also referred to as a sensor PWB assembly. The adhesive tape 324 is formed of double-sided tape (adhesive material).

Figure 15:
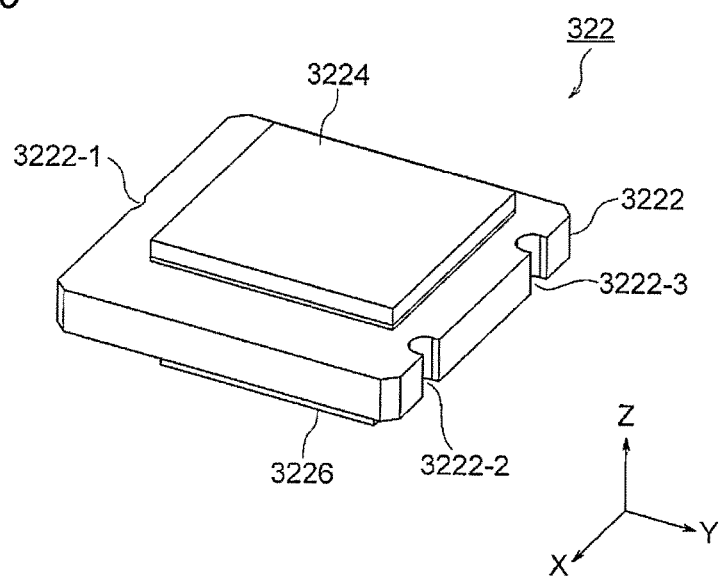
FIG. 15 is a perspective view showing a sensor board assembly for use in the camera device shown in FIG. 1 as viewed from the front side.
Figure 16:
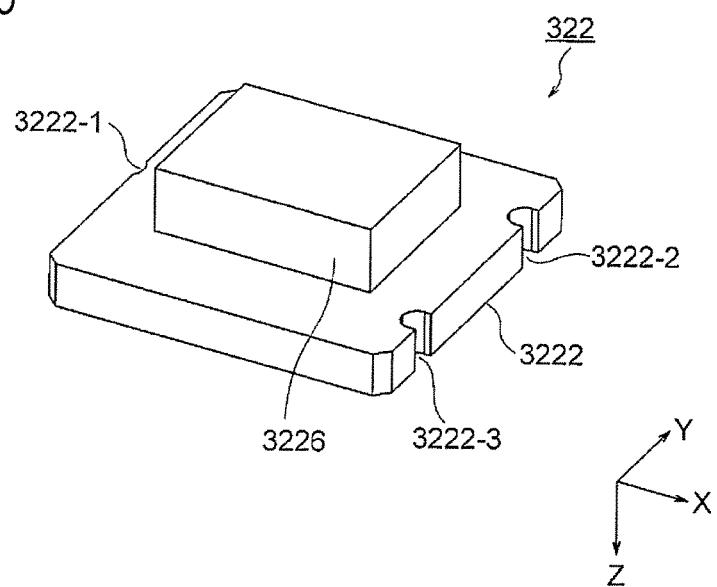
FIG. 16 is a perspective view showing the sensor board assembly for use in the camera device shown in FIG. 1 as viewed from the back side.

FIG. 15 is a perspective view showing the sensor board assembly 322 as viewed from the front side, and FIG. 16 is a perspective view showing the sensor board assembly 322 as viewed from the back side.

The sensor board assembly 322 has a sensor board 3222, an imaging element 3224 and a first connector 3226. The sensor board 3222 is also referred to as a sensor PWB. Furthermore, the first connector 3226 is also referred to as a sensor-side connector. In the example shown in the figures, the first connector 3226 is formed of a plug connector (male connector).

The imaging element 3224 is mounted on the front face of the sensor board 3222 as shown in FIG. 15.

The first connector 3226 is mounted on the back face of the sensor board 3222 as shown in FIG. 16.

The imaging element 3224 converts the subject image formed by the above-mentioned lens group 22 into an electric signal. The imaging element 3224 is formed of, for example, a CCD (charge coupled device) type image sensor or a CMOS (complementary metal oxide semiconductor) type image sensor.

Next, the method for assembling the sensor board unit 32 will be described referring to FIGS. 17 to 19.

Figure 17:
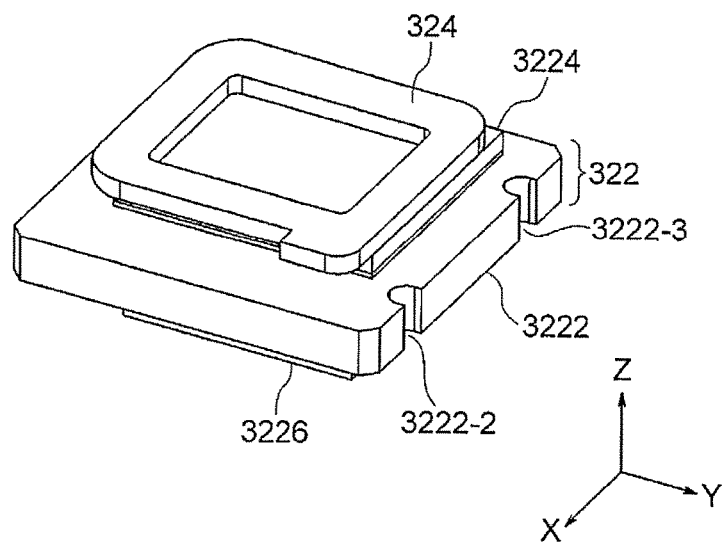
FIG. 17 is a perspective view showing a state in which adhesive tape has been attached to the upper face of the imaging element of the sensor board assembly shown in FIG. 15.

First, the adhesive tape 324 is attached to the upper face of the imaging element 3224 of the sensor board assembly 322 as shown in FIG. 17.

Figure 18:
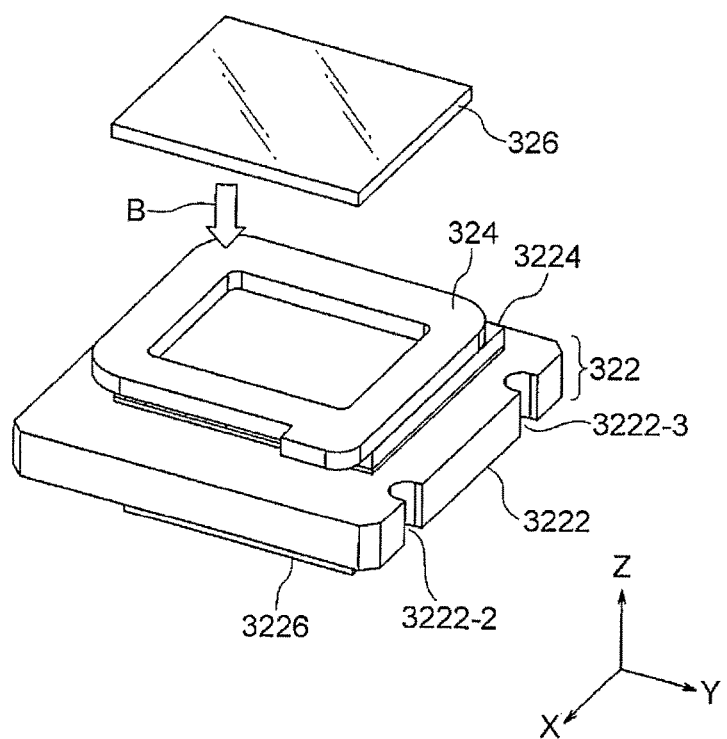
FIG. 18 is an exploded perspective view showing a state in which an infrared ray cut filter (IRCF) is being attached to the adhesive tape so as to be mounted on the imaging element.

Next, the infrared ray cut filter (IRCF) 326 is attached to the adhesive tape 324 as indicated by a hollow arrow B in FIG. 18 and mounted on the imaging element 3224.

As a result, the sensor board unit 32 shown in FIG. 19 is assembled.

Figure 20:
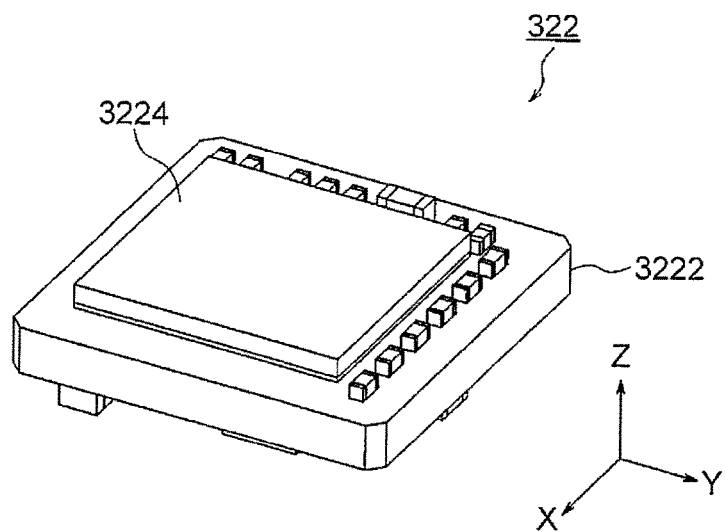
FIG. 20 is a perspective view showing in detail the configuration of the sensor board assembly shown in FIG. 15.
Figure 21:
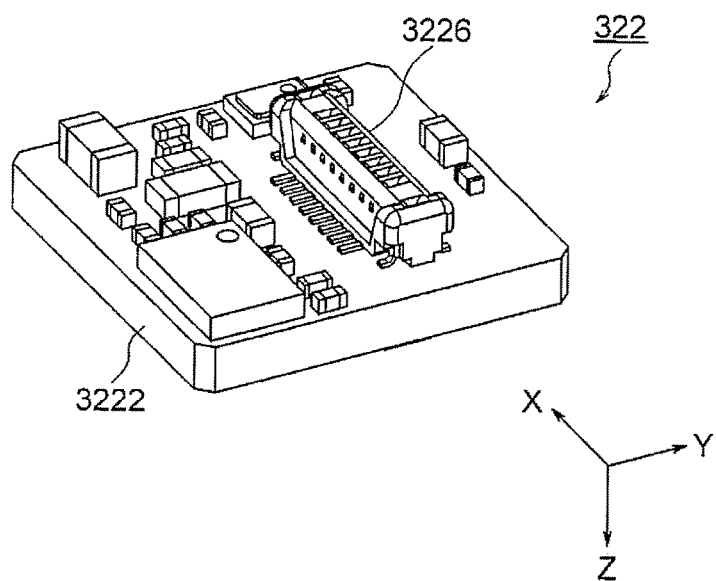
FIG. 21 is a perspective view showing in detail the configuration of the sensor board assembly shown in FIG. 16.

FIGS. 20 and 21 are views showing the configuration of the sensor board assembly 322 in more detail. FIG. 20 is a perspective view showing the sensor board assembly 322 as viewed from the front side, and FIG. 21 is a perspective view showing the sensor board assembly 322 as viewed from the back side.

As clearly shown in FIGS. 20 and 21, not only the imaging element 3224 and the sensor-side connector (the plug connector) 3226 but also chip capacitors, chip resistors, a flash ROM (read only memory), a crystal oscillator, etc. are mounted as mounting components on the sensor board 3222 of the sensor board assembly 322.

Next, the configuration of the power source board unit 34 and a method for assembling the power source board unit will be described referring to FIGS. 22 to 25.

Figure 25:
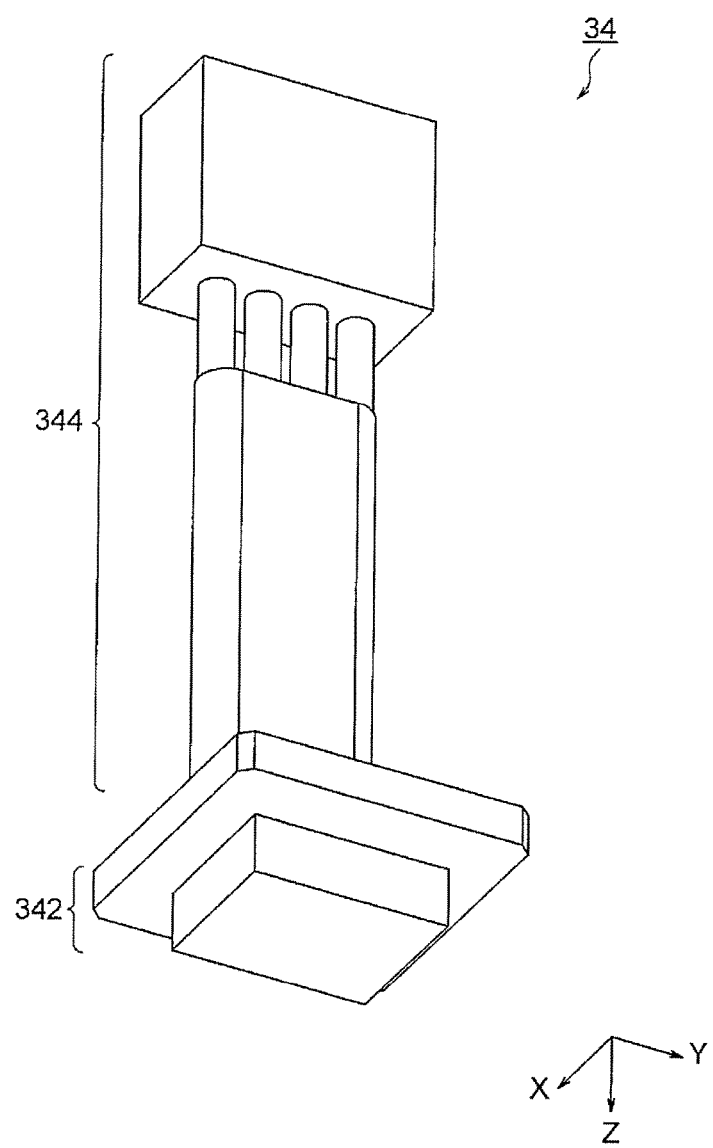
FIG. 25 is a perspective view showing a power source board unit for use in the camera device shown in FIG. 1 as viewed from the back side.

The power source board unit 34 is composed of the power source board assembly 342 and the harness assembly 344 as shown in FIG. 25. The power source board assembly 342 is also referred to as a power source PWB assembly.

Figure 22:
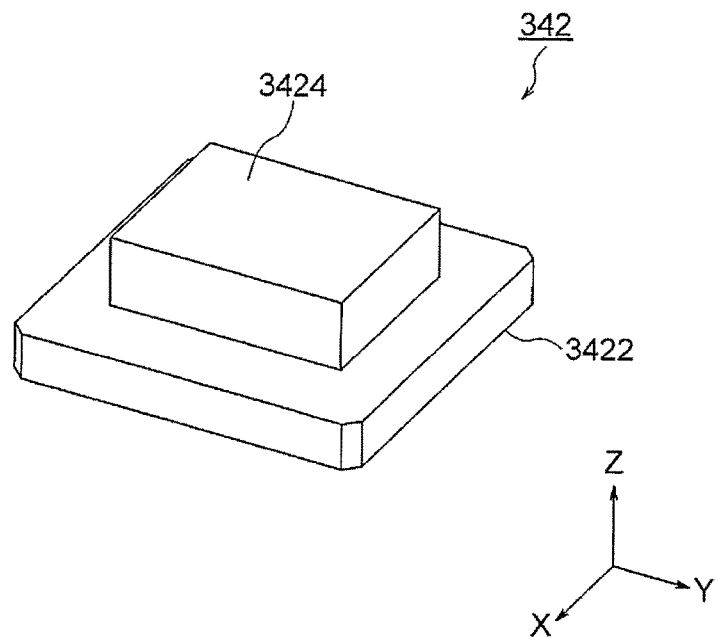
FIG. 22 is a perspective view showing a power source board assembly for use in the camera device shown in FIG. 1 as viewed from the front side.
Figure 23:
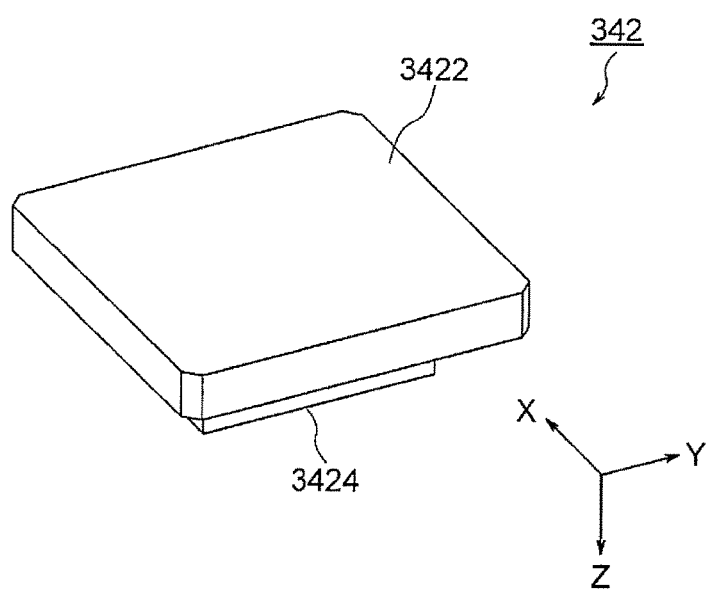
FIG. 23 is a perspective view showing the power source board assembly for use in the camera device shown in FIG. 1 as viewed from the back side.

FIG. 22 is a perspective view showing the power source board assembly 342 as viewed from the front side, and FIG. 23 is a perspective view showing the power source board assembly 342 as viewed from the back side.

The power source board assembly 342 has a power source board 3422 and a second connector 3424. The power source board 4322 is also referred to as a power source PWB. Furthermore, the second connector 3424 is also referred to as a power source side connector. In the example shown in the figures, the second connector 3424 is formed of a receptacle connector (female connector).

The second connector 3424 is mounted on the front face of the power source board 3422 as shown in FIG. 22.

Next, the method for assembling the power source board unit 34 will be described referring to FIGS. 24 and 25.

Figure 24:
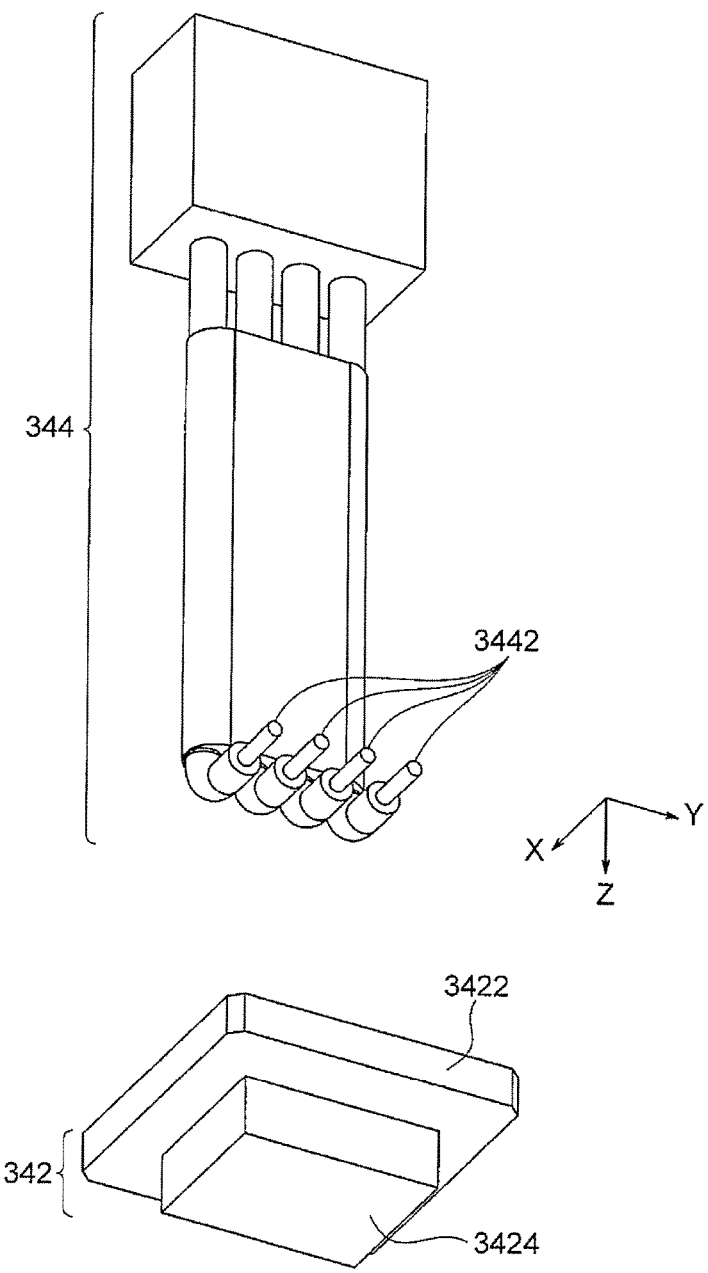
FIG. 24 is an exploded perspective view showing a state in which the cables (wires) of a harness assembly are being soldered to the power source board assembly shown in FIG. 23.

The cables (wires) 3442 of the harness assembly 344 are manually soldered to the back face of the power source board assembly 342 as shown in FIG. 24.

As a result, the power source board unit 34 shown in FIG. 25 is assembled.

Figure 26:
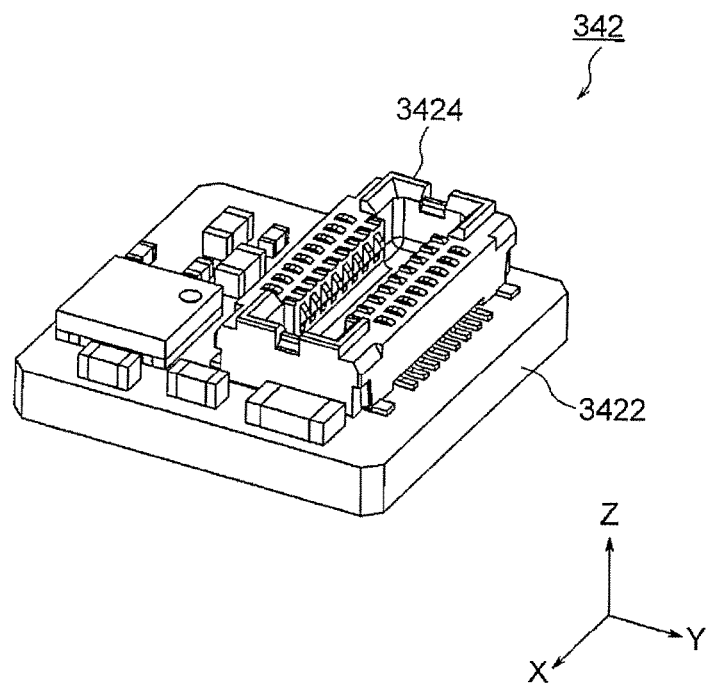
FIG. 26 is a perspective view showing in detail the configuration of the power source board assembly shown in FIG. 22.
Figure 27:
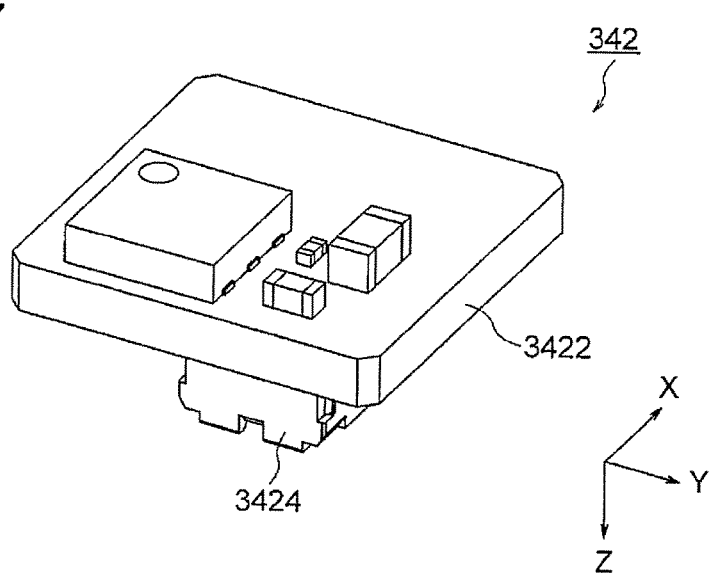
FIG. 27 is a perspective view showing in detail the configuration of the power source board assembly shown in FIG. 23.

FIGS. 26 and 27 are views showing the configuration of the power source board assembly 342 in more detail. FIG. 26 is a perspective view showing the power source board assembly 342 as viewed from the front side, and FIG. 27 is a perspective view showing the power source board assembly 342 as viewed from the back side.

As clearly shown in FIGS. 26 and 27, not only the power source side connector (receptacle connector) 3424 but also chip capacitors, chip resistors, a flash ROM (read only memory), a crystal oscillator, etc. are mounted as mounting components on the power source board 3422 of the power source board assembly 342.

Next, a method for assembling the board unit 30 will be described referring to FIGS. 28 to 29.

Figure 28:
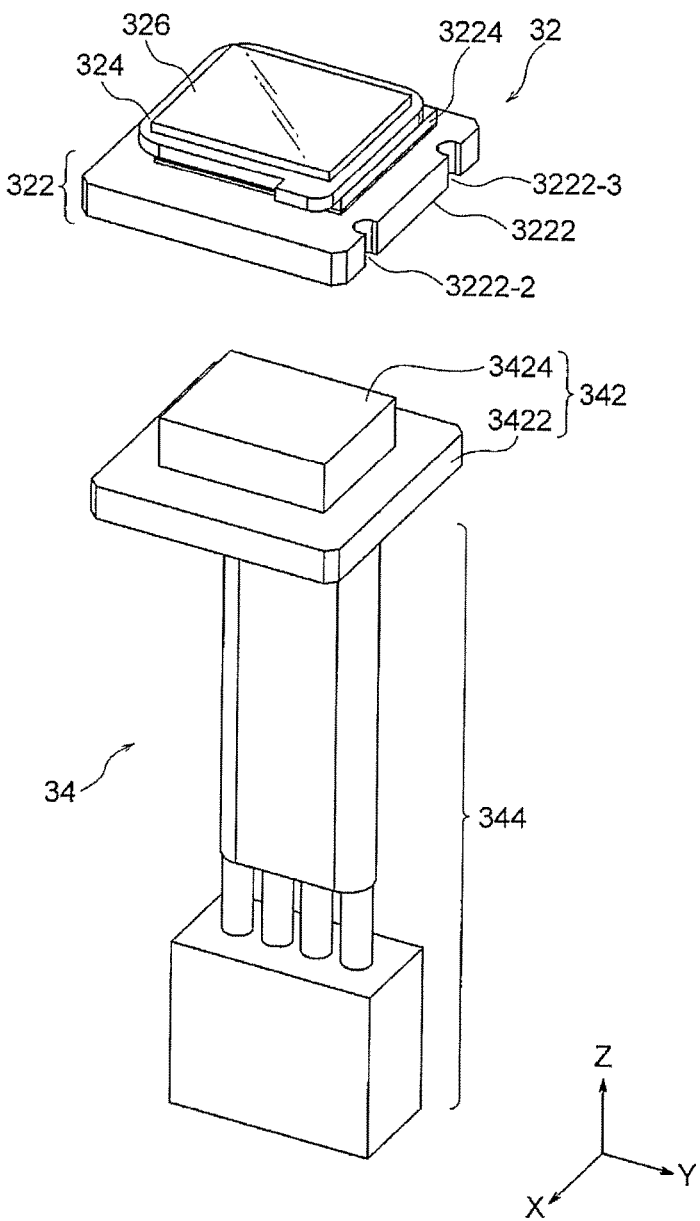
FIG. 28 is an exploded perspective view showing a state in which the first connector of the sensor board unit shown in FIG. 19 is being fitted into the second connector of the power source board unit shown in FIG. 25.

The first connector (plug connector) 3226 of the sensor board unit 32 is fitted into the second connector (receptacle connector) 3424 of the power source board unit 34 as shown in FIG. 28. The combination of the first connector 3226 and the second connector 3424 is referred to as an inter-board connector (3226, 3424). Hence, the sensor board unit 32 and the power source board unit 34 are fitted via the inter-board connector (3226, 3424).

Figure 29:
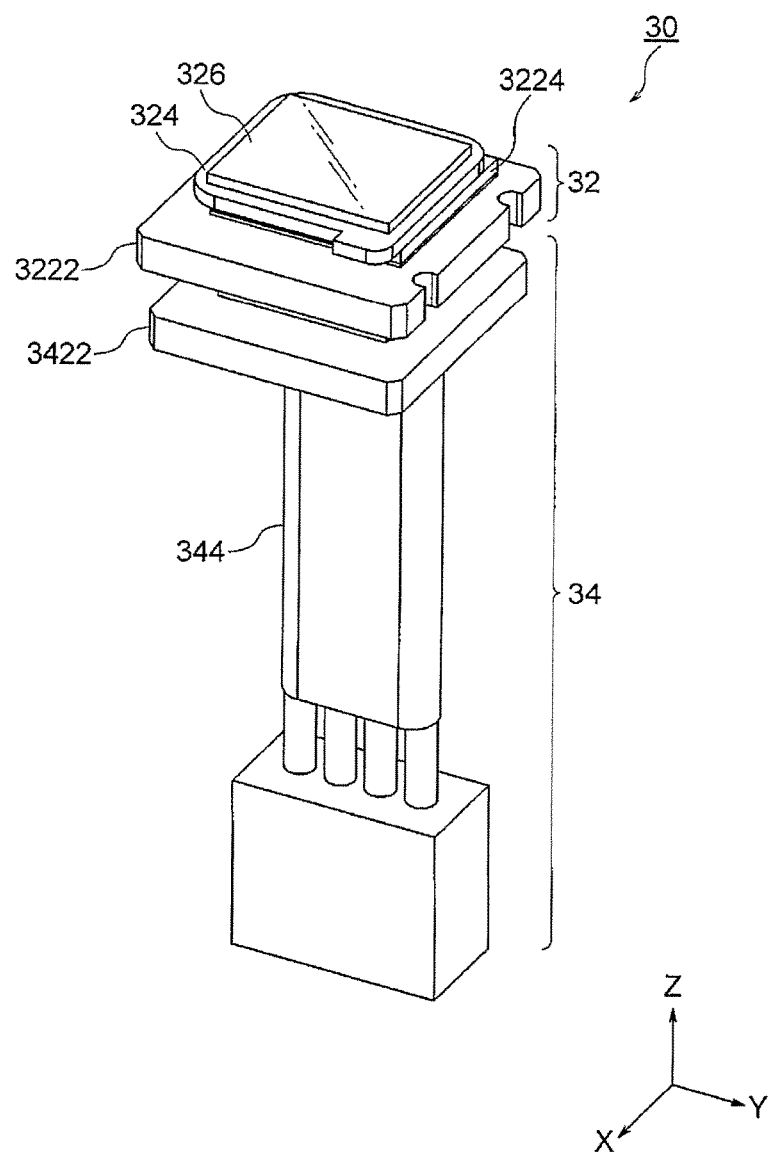
FIG. 29 is a perspective view showing a board unit for use in the camera device shown in FIG. 1.

As a result, the board unit 30 shown in FIG. 29 is assembled.

The combination of the sensor board assembly 322 of the sensor board unit 32 and the power source board assembly 342 of the power source board unit 34 is referred to as the above-mentioned board module (322, 342). The board module (322, 342) is accommodated inside the above-mentioned board accommodating space SS of the holding member 24 as described later.

Next, a method for assembling the camera device 10 will be described referring to FIGS. 30 to 35.

Figure 30:
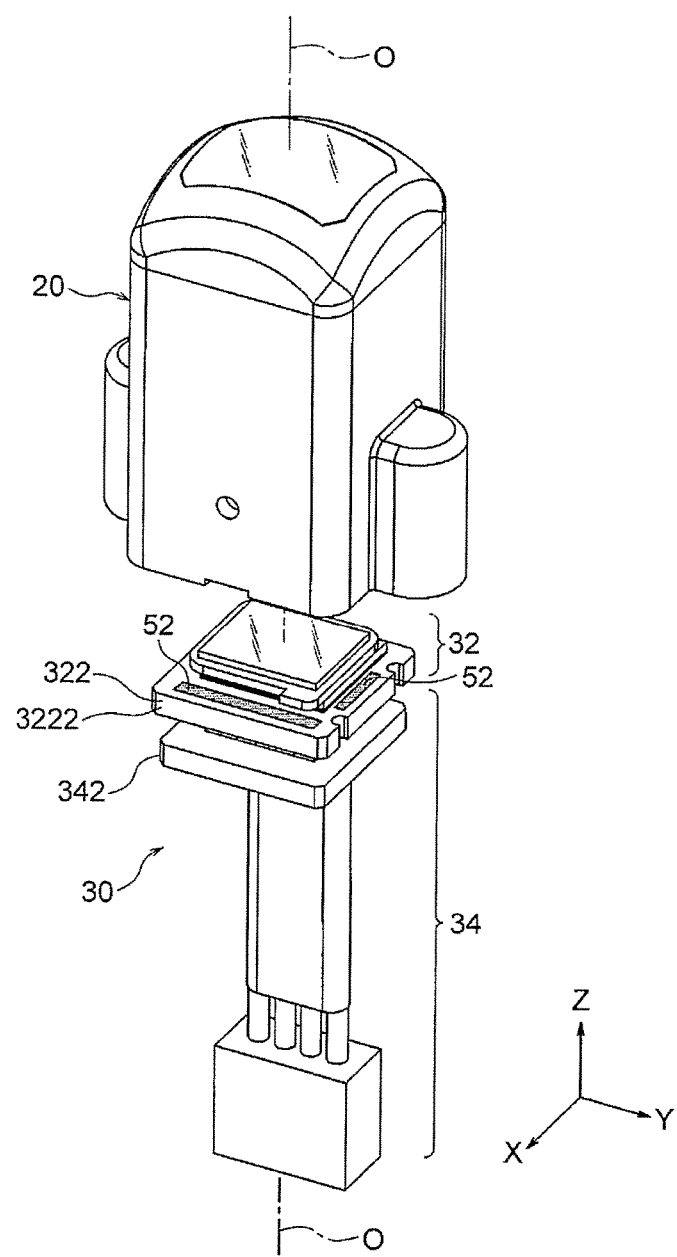
FIG. 30 is an exploded perspective view showing a state in which adhesive has been applied onto the sensor board of the board unit.

First, adhesive 52 is applied onto the sensor board 3222 of the board unit 30 as shown in FIG. 30. Although acrylic epoxy resin is used as the adhesive 52 in the example shown in the figure, the adhesive is not limited to the resin.

Figure 31:
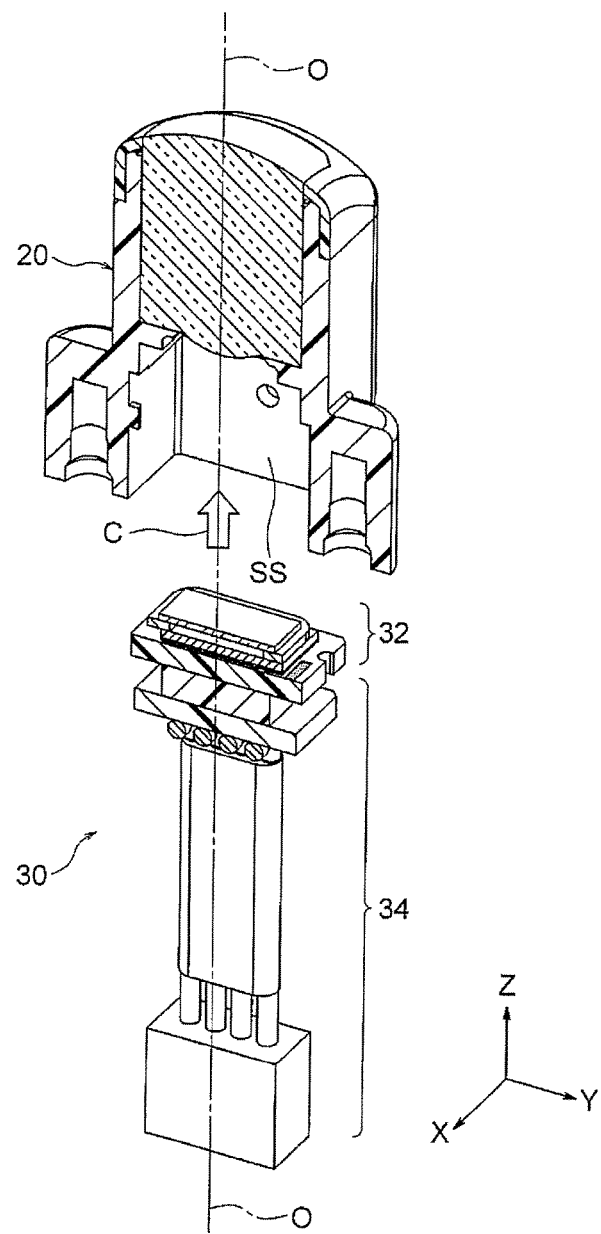
FIG. 31 is an exploded sectional perspective view showing a state in which the board unit shown in FIG. 29 is being inserted into the holding member of the lens unit shown in FIG. 14.
Figure 32:
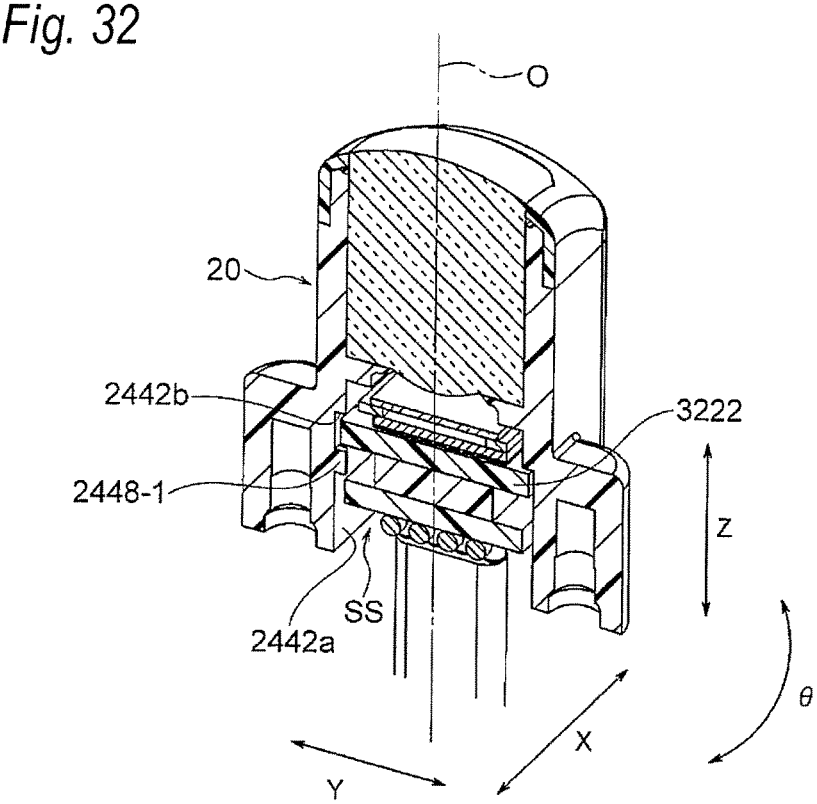
FIG. 32 is an exploded sectional perspective view showing a state in which the focal distance and rotational inclination are adjusted to optimal positions to eliminate the deviation between the optical axis of the lens unit and the optical axis of the board unit.

Next, the board unit 30 is inserted into the holding member 24 of the lens unit 20 as indicated by a hollow arrow C as shown in FIG. 31, and the board unit 30 is bonded to the lens unit 20 via the adhesive 52.

At the time of the bonding, the focal distance and rotational inclination are adjusted to optimal positions to eliminate the deviation between the optical axis O of the lens unit 20 and the optical axis O of the board unit 30. In other words, adjustment is made so that the center of the imaging element 3224 is aligned with the center of the optical axis O and the focusing position of the lens group 22.

Figure 33:
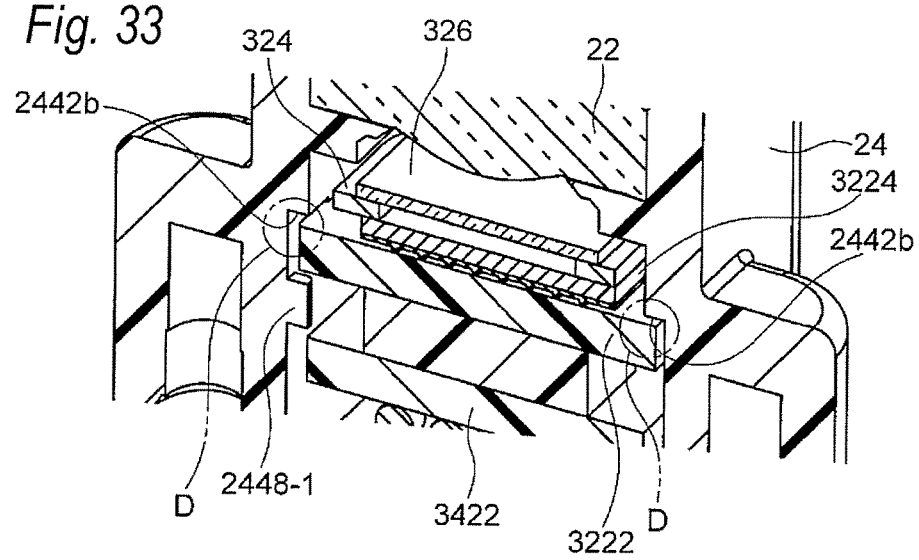
FIG. 33 is an enlarged partially sectional perspective view showing the bonded portion of the sensor board of the board unit.

FIG. 33 is an enlarged partially sectional perspective view showing the bonded portions of the sensor board 3222 of the board unit 30. At the bonded portions indicated by circle marks D in FIG. 33, the sensor board 3222 of the board unit 30 is bonded to the board mounting face 2442*b* of the holding member 24 via the adhesive 52.

Next, temporary fixing is performed by UV-irradiating the above-mentioned bonded portions and then permanent fixing is performed by thermosetting in an oven.

As a result, a camera module (20, 30) in which the board unit 30 is fixed to the lens unit 20 is assembled.

Figure 34:
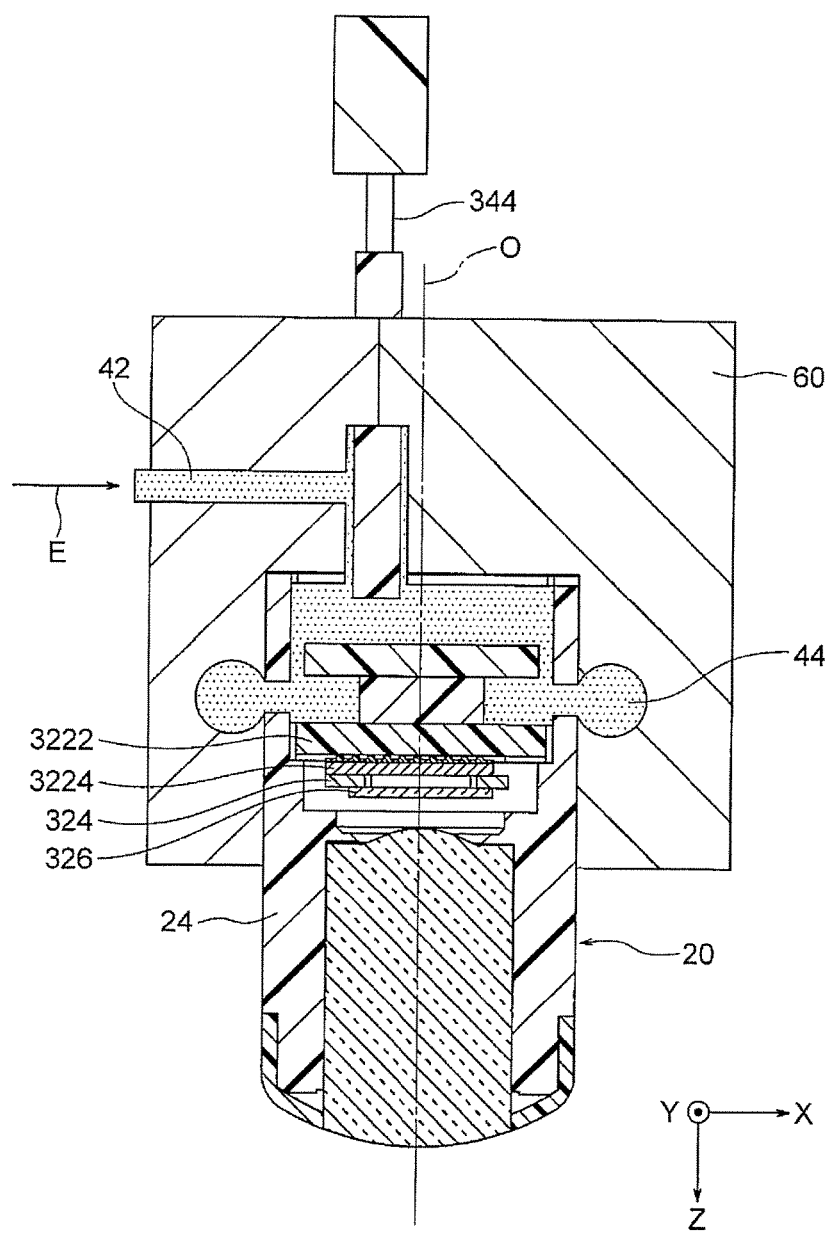
FIG. 34 is a vertical sectional view showing a state in which, after the camera module shown in FIG. 32 being in a state of turned upside down is set in a dedicated metal mold, hot melt adhesive is injected into the metal mold, and the interior of the camera module is filled with the hot melt adhesive.

Next, this camera module (20, 30) being in a state of turned upside down is set in a dedicated metal mold 60 as shown in FIG. 34. Then, hot melt adhesive 42 is injected into the metal mold 60 as indicated by an arrow E in FIG. 34, whereby the interior of the camera module (20, 30) is filled with the hot melt adhesive 42. As a result, the clearance (board accommodating space SS) between the holding member 24 and the board unit 30 is sealed with the hot melt adhesive 42. Then, the hot melt adhesive 42 is allowed to cure spontaneously at normal temperature.

As the hot melt adhesive 42, for example, thermoplastic resin, such as ethylene-vinyl acetate (EVA), can be used, but the adhesive is not limited to the resin. At this time, a resin pool 44 is formed inside the metal mold 60 as shown in FIG. 34.

Figure 35:
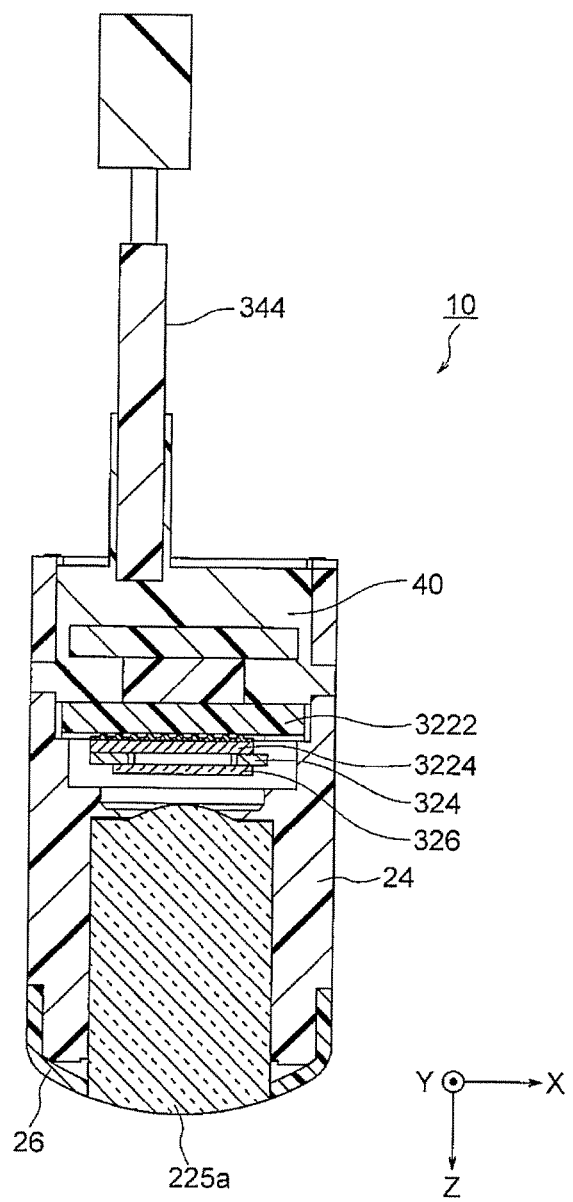
FIG. 35 is a vertical sectional view showing a state in which the metal mold has been removed from the camera module having been filled with the hot melt adhesive and a resin pool has been cut off.

Then, the metal mold 60 is removed from the camera module (20, 30) that has been filled with the hot melt adhesive 42, and the resin pool 44 is cut off as shown in FIG. 35. As a result, the lower section of the holding member 24 is sealed with the sealing member 40.

In this way, the camera device 10 shown in FIGS. 1 to 4 is assembled.

Summarizing the above descriptions, the method for assembling the camera device 10 further includes, in addition to the steps in the above-mentioned method for assembling the lens unit 20, a sensor board unit preparing step for preparing a sensor board unit (32) including a sensor board assembly (322) on which an imaging element (3224) is mounted; a power source board unit assembling step for assembling a power source board unit (34) by soldering the cables (3442) of a harness assembly (344) to a power source board assembly (342); a board unit assembling step for assembling a board unit (30) by fitting the power source board unit (34) and the sensor board unit (32) via an inter-board connector (3226, 3424); a board unit fixing step for inserting the board unit (30) from below into a holding member (24) and for fixing the sensor board unit (32) of the board unit (30) to the board accommodating inner wall face (2442*a*) of the holding member (24) communicating with a lens accommodating inner wall face (2422*a*) and provided under the holding member (24) while making adjustment so that the center of the imaging element (3224) is aligned with the center of the optical axis (O) and the focusing position of the lens group (22); and a sealing step for sealing the lower section of the holding member (24) with a sealing member (40).

Next, a method for inserting the board unit 30 into the holding member 24 of the lens unit 20 will be described as shown in FIG. 31 referring to FIGS. 36 to 39.

Figure 36:
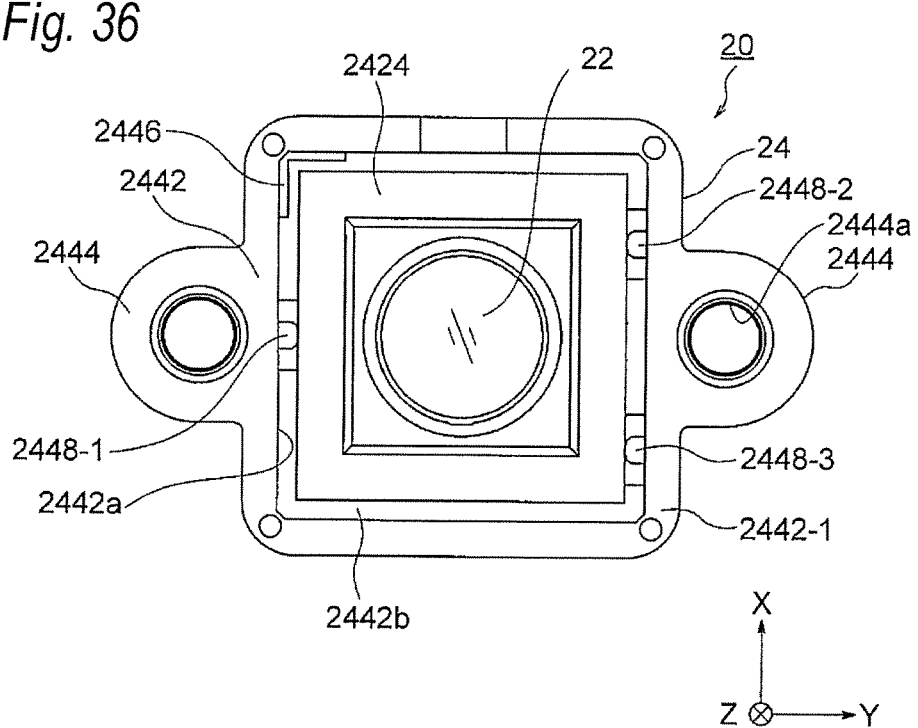
FIG. 36 is a bottom view showing the lens unit for use in the camera device shown in FIG. 1.
Figure 37:
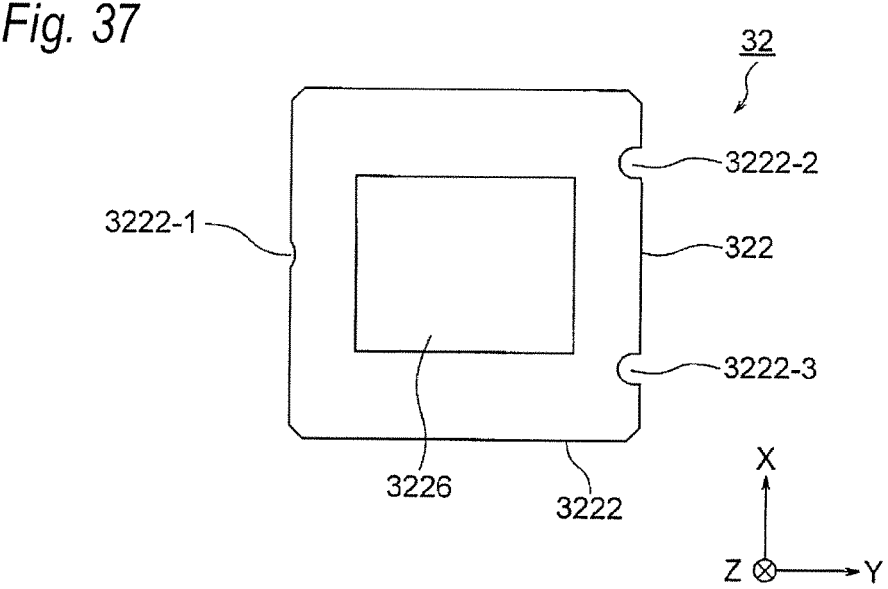
FIG. 37 is a bottom view showing the sensor board unit of the board unit for use in the camera device shown in FIG. 1.

FIG. 36 is a bottom view showing the lens unit 20, and FIG. 37 is a bottom view showing the sensor board unit 32 of the board unit 30.

The bracket section 244 of the holding member 24 of the lens unit 20 has an L-shaped abutting section 2446 formed so as to protrude inward from the board accommodating inner wall face 2442*a* at one corner of the lower cylindrical section 2442-1 and in the vicinity of the board mounting face 2442*b* as shown in FIG. 36. Furthermore, the bracket section 244 has first to third protrusions 2448-1, 2448-2 and 2448-3 protruding inward from the board accommodating inner wall face 2442*a* of the lower cylindrical section 2442-1. The first protrusion 2448-1 is formed at the central section of the left wall face of the board accommodating inner wall face 2442*a* in the left-right direction Y. The second and third protrusions 2448-2 and 2448-3 are formed on the sides of both the end sections of the right wall face of the board accommodating inner wall face 2442*a* in the left-right direction Y so as to be symmetrical with respect to the straight line passing through the optical axis O in the left-right direction Y.

The sensor board 3222 in the sensor board assembly 322 of the sensor board unit 32 of the board unit 30 has first to third slits 3222-1, 3222-2 and 3222-3 formed on its side faces as shown in FIG. 37. The first slit 3222-1 is formed at the central section of the left side face of the sensor board 3222 in the left-right direction Y. The second and third slits 3222-2 and 3222-3 are formed on the sides of both the end sections of the right side face of the sensor board 3222 in the left-right direction Y so as to be symmetrical with respect to the straight line passing through the optical axis O in the left-right direction Y. In other words, the first to third slits 3222-1 to 3222-3 are provided at the positions respectively corresponding to the above-mentioned first to third protrusions 2448-1 to 2448-3.

Figure 38:
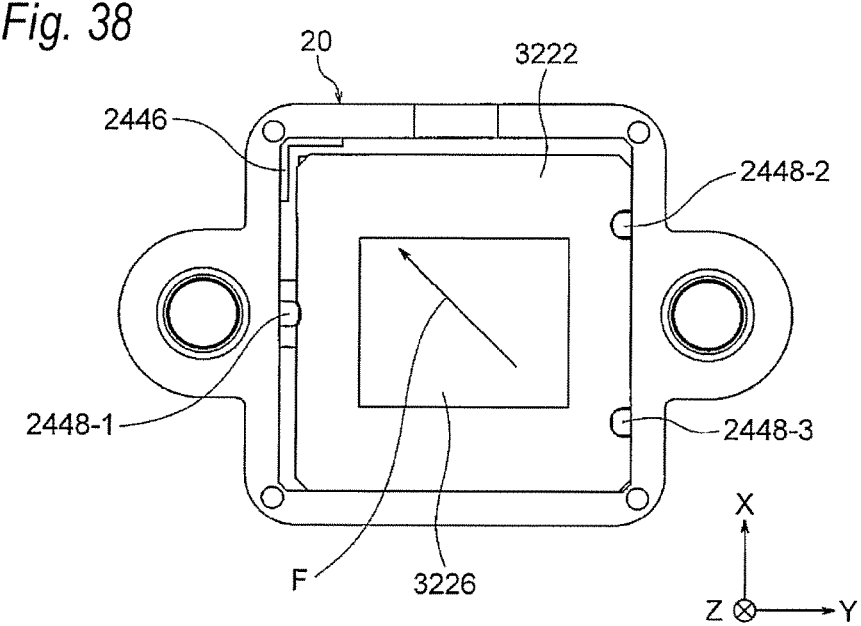
FIG. 38 is a bottom view showing a state in which, after the first to third slits of the sensor board unit of the board unit shown in FIG. 37 have been passed through the first to third protrusions of the holding member of the lens unit shown in FIG. 36, the board unit is being moved with respect to the lens unit.

In the lens unit 20 and the board unit 30 having these configurations, in the case that the board unit 30 is inserted into the holding member 24 of the lens unit 20, the first to third slits 3222-1 to 3222-3 of the sensor board unit 32 of the board unit 30 are first passed through the first to third 2448-1 to 2448-3 of the holding member 24 of the lens unit 20, respectively, as shown in FIG. 38.

Figure 39:
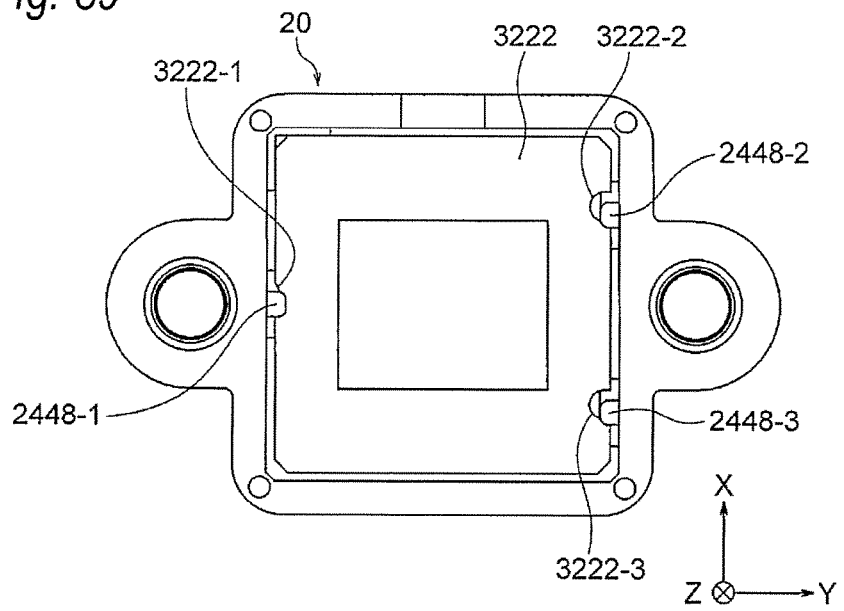
FIG. 39 is a bottom view showing a state in which a corner section of the sensor board shown in FIG. 37 is abutted to the abutting section of the holding member of the lens unit shown in FIG. 36.

Then, the board unit 30 is moved with respect to the lens unit 20 as indicated by an arrow F in FIG. 38, whereby a corner section of the sensor board 3222 is abutted to the abutting section 2446 of the holding member 24 of the lens unit 20 as shown in FIG. 39.

In this way, the board unit 30 is inserted into the holding member 24 of the lens unit 20.

As made clear by the above descriptions, with the first embodiment of the present invention, the camera device 10 can be assembled easily using a small number of components.

Figure 40A:
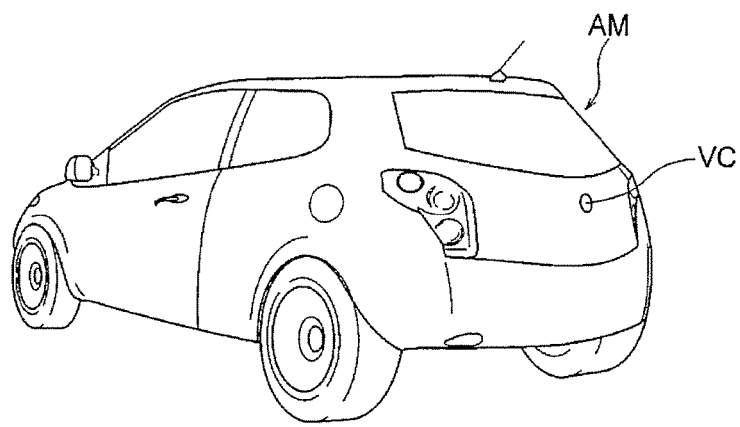
FIGS. 40A and 40B are views showing a state in which the camera device shown in FIG. 1 is mounted on an automobile AM as a vehicle-mounted camera VC.
Figure 40B:
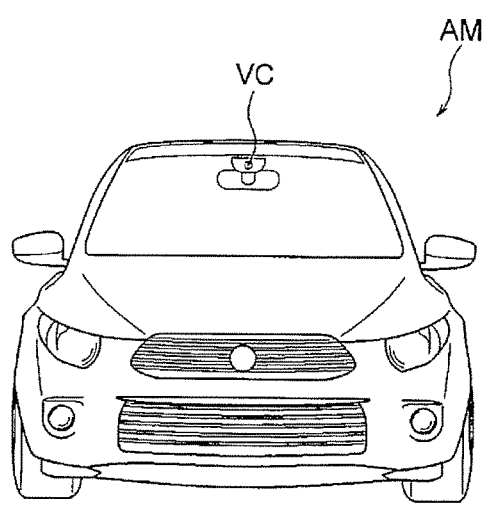

FIGS. 40A and 40B are views showing a state in which the camera device 10 is mounted as a vehicle-mounted camera VC on an automobile AM. FIG. 40A is a perspective view showing the automobile AM as viewed from the rear side, and FIG. 40B is a front view showing the automobile AM as viewed from the front side.

The camera device 10 is mounted as a back monitor camera VC at the rear section of the automobile AM as shown in FIG. 40A.

Furthermore, the camera device 10 is mounted as a front monitor camera VC at the front section of the automobile AM as shown in FIG. 40B.

Second Embodiment

The structure of a camera device 10A according to a second embodiment of the present invention will be described referring to FIGS. 41 to 43. Like the camera device 10 according to the above-mentioned first embodiment, the camera device 10A shown in the figures is formed of a vehicle-mounted camera for use as a back monitor camera VC provided at the rear section of a vehicle body. The camera device 10A may also be a vehicle-mounted camera for use as a camera VC, such as a front monitor camera provided at the front section of the vehicle body.

Figure 41:
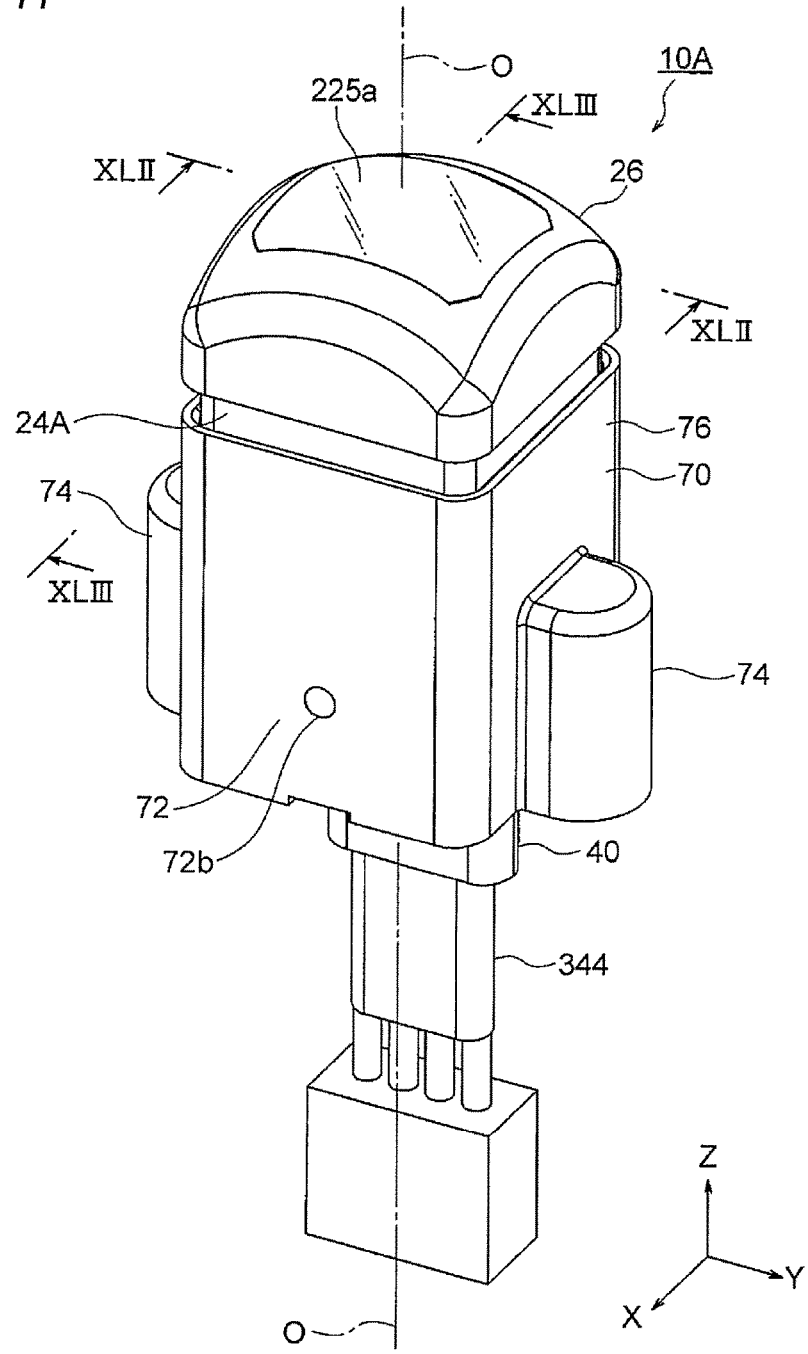
FIG. 41 is an external perspective view showing a camera device according to a second embodiment of the present invention.

FIG. 41 is an external perspective view showing the camera device 10A. FIG. 42 is a vertical sectional view taken on line XLII-XLII of FIG. 41. FIG. 43 is a vertical sectional view taken on line XLIII-XLIII of FIG. 41.

Figure 42:
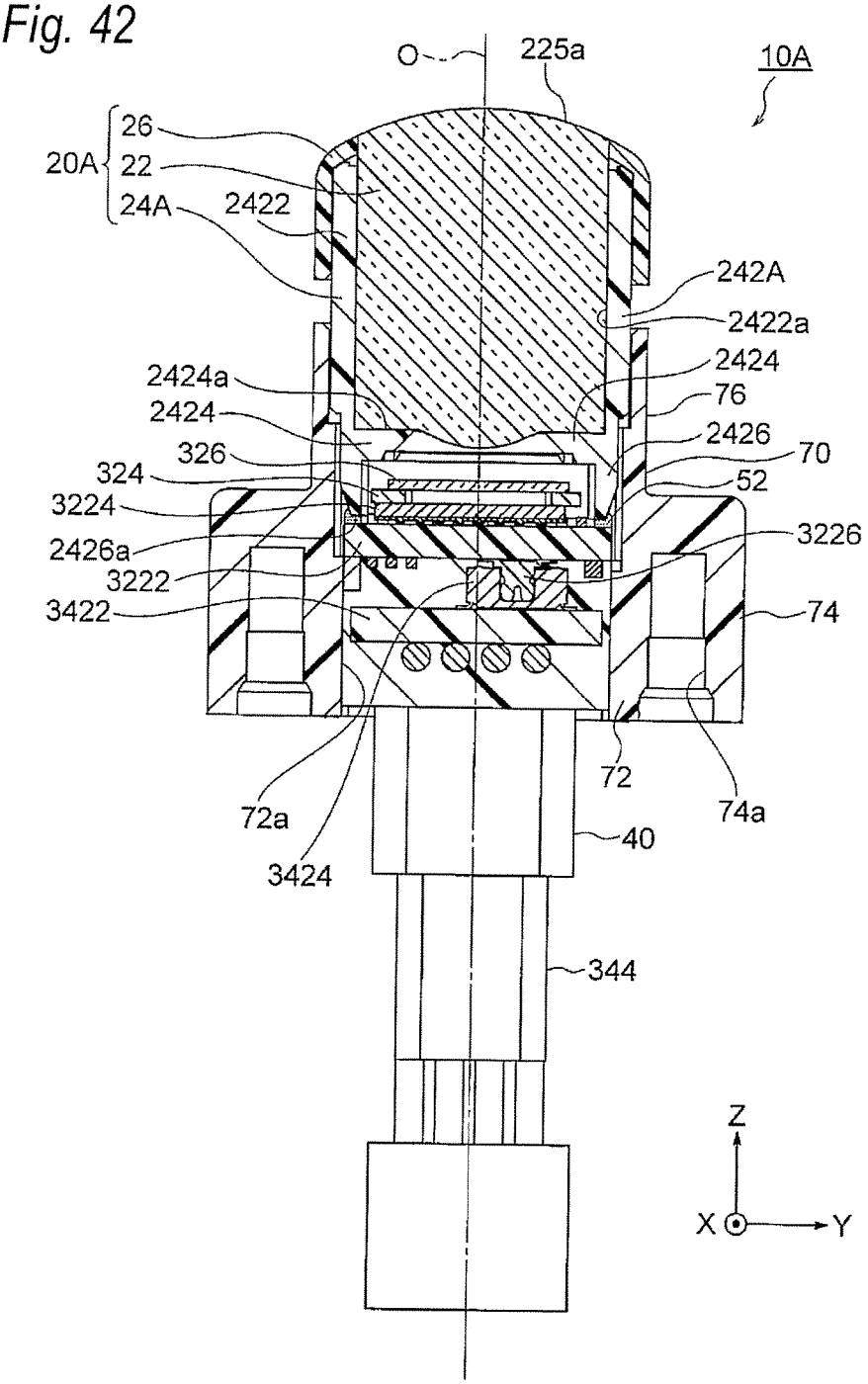
FIG. 42 is a vertical sectional view taken on line XLII-XLII of FIG. 41.
Figure 43:
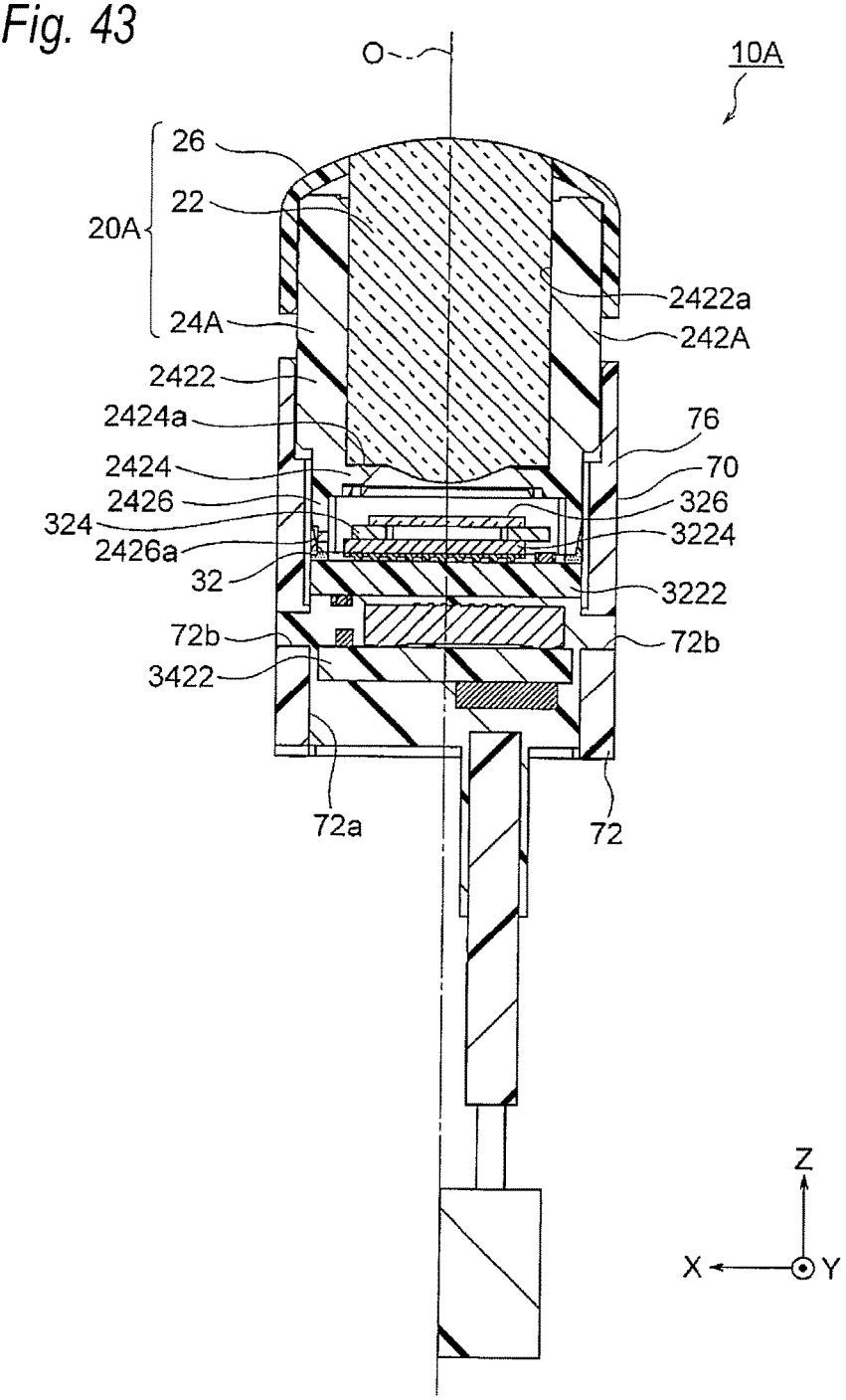
FIG. 43 is a vertical sectional view taken on line XLIII-XLIII of FIG. 41.

An orthogonal coordinate system (X, Y, Z) is herein used as shown in FIGS. 41 to 43. In the states shown in FIGS. 41 to 43, in the orthogonal coordinate system (X, Y, Z), the X-axis direction is the front-rear direction (depth direction), the Y-axis direction is the left-right direction (width direction), and the Z-axis direction is the up-down direction (height direction). Furthermore, in the example shown in FIGS. 41 to 43, the up-down direction Z is the direction of the optical axis O of the lens. In the example shown in the figures, the upward direction in the up-down direction Z is the direction where a subject (not shown) is present. In the second embodiment, the Y-axis direction (left-right direction) is also referred to as a first direction and the X-axis direction (left-right direction) is also referred to as a second direction.

The camera device 10A shown in the figures has a configuration similar to that of the camera device 10 according to the first embodiment, except that the configuration of the lens unit is different and that a bracket 70 is provided as a separate member. Hence, the lens unit is designated by reference sign 20*k* In the following descriptions, components similar to those of the camera device 10 according to the first embodiment are designated by the same reference signs, and their descriptions are omitted to simplify explanation. In the following descriptions, only the differences from the camera device 10 according to the first embodiment will be described in detail.

Hence, the camera device 10A is mainly composed of four components. In other words, the camera device 10A is composed of a lens unit 20A, a bracket 70, the board unit 30 and the sealing member 40.

The lens unit 20A has a configuration similar to that of the lens unit 20 according to the first embodiment, except that the configuration of the holding member is different. Hence, the holding member is designated by reference sign 24A.

In the lens unit 20 according to the first embodiment, the holding member 24 has a structure in which the barrel section 242 and the bracket section 244 are integrated.

On the other hand, in the lens unit 20A according to the second embodiment, the holding member 24A is composed of only a barrel 242A.

The barrel section 242 of the holding member 24 according to the first embodiment is composed of only the cylindrical section 2422 and the engagement section 2424.

On the other hand, the barrel 242A of the holding member 24A according to the second embodiment is further provided with a lower extension section 2426 having a square cylindrical shape and extended downward from the engagement section 2424 in addition to the cylindrical section 2422 and the engagement section 2424. The lower face 2426*a* of the lower extension section 2426 operates as a board mounting face for mounting the sensor board 3222 of the sensor board unit 32 of the board unit 30.

The bracket 70 has a configuration substantially similar to that of the bracket section 244 of the holding member 24 according to the first embodiment except that the bracket is changed as described later.

In other words, the bracket section 244 according to the first embodiment is composed of only the cylindrical section 2422 and the pair of screw holding sections 2444.

On the other hand, the bracket 70 according to the second embodiment is provided with not only a cylindrical section 72 and a pair of screw holding sections 74 but also an upper extension section 76 extended upward from the cylindrical section 72 and covering the outer wall face of the holding member 24A (barrel 242A). Each of the screw holding sections 74 has a semi-cylindrical outer shape and has a screw insertion hole 74*a* bored in the up-down direction Z. The inner wall face of the cylindrical section 72 of the bracket 70 operates as a board accommodating inner wall face 72*a* for accommodating the board unit 30. Furthermore, the cylindrical section 72 of the bracket 70 has a pair of air vent holes 72*b*.

Since a method for assembling the lens unit 20A is substantially identical to the method for assembling the lens unit 20 according to the above-mentioned first embodiment except that the holding member 24 is changed to the holding member 24A, the detailed description is omitted.

Hence, the method for assembling the lens unit 20A includes a lens group preparing step for preparing a lens group (22) composed of a plurality of lenses (221 to 225) each having an outer shape not having the area that is not used by an imaging element (3224); a lens group holding step for sequentially inserting the plurality of lenses (221 to 225) from above into a cylindrical holding member (24A) having a lens accommodating inner wall face (2422*a*) conforming to the outer shape of the lens group (22) and for holding the lens group (22) inside the holding member (24A); and a retainer mounting step, in a state in which the upper face (255*a*) of the upper lens (225) of the lens group (22) provided at the upper end of the holding member (24A) is exposed, for mounting a retainer (26) having an opening (264*a*) on the upper end of the holding member (24A) so as to enclose the outer peripheral edge of the upper lens (225) in order to prevent water from entering the interior of this holding member (24A).

Since methods for assembling the sensor board unit 32 and the power source board unit 34 are subsequently identical to the methods for assembling the sensor board unit 32 and the power source board unit 34 according to the above-mentioned first embodiment, their descriptions are also omitted.

Next, a method for assembling a first camera module will be described referring to FIGS. 44 to 46.

Figure 44:
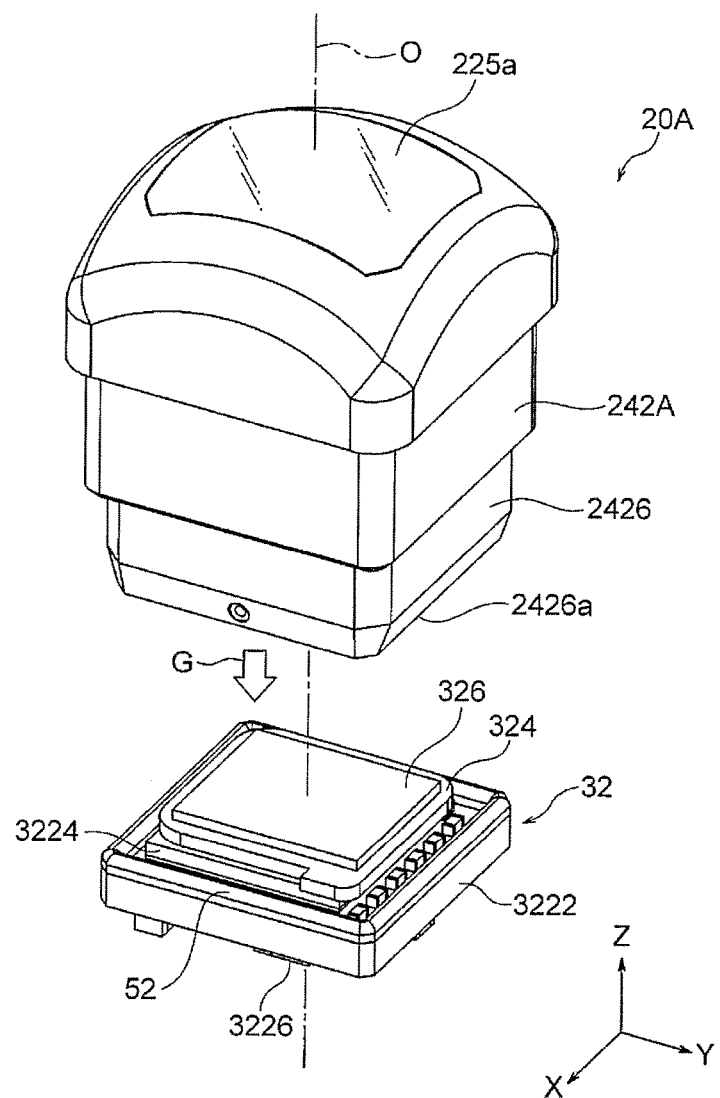
FIG. 44 is an exploded perspective view showing a state in which, after adhesive has been applied to the front face of the sensor board of the sensor board unit for use in the camera device shown in FIG. 41, the sensor board unit is being abutted to the lower end of the barrel of the lens unit.

First, the adhesive 52 made of acrylic epoxy resin is applied to the front face of the sensor board 3222 of the sensor board unit 32 as shown in FIG. 44. Then, the sensor board unit 32 is abutted to the lower end (board mounting face) 2426*a* of the barrel 242A of the lens unit 20A as indicated by a hollow arrow G in FIG. 44.

Figure 45:
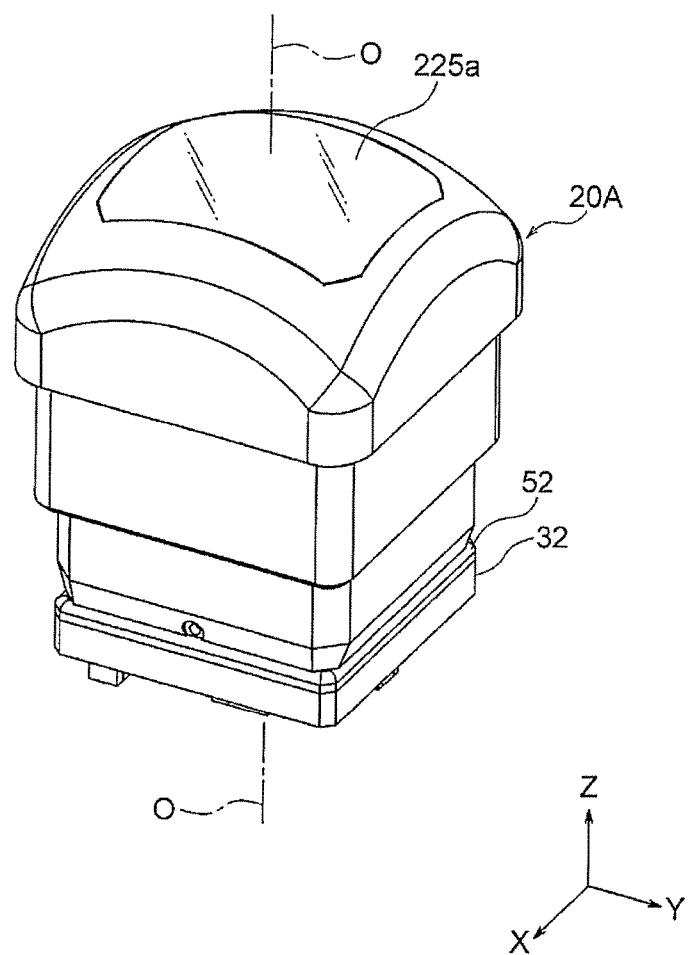
FIG. 45 is a perspective view showing a state in which a first camera module has been assembled by bonding the sensor board unit to the lens unit.
Figure 46:
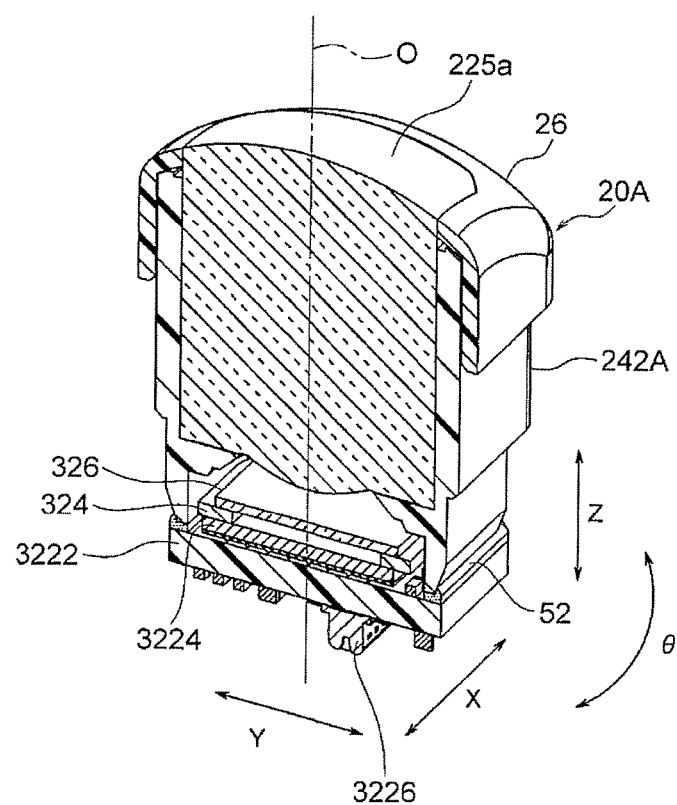
FIG. 46 is a sectional perspective view showing a state in which the focal distance and rotational inclination are adjusted to optimal positions to eliminate the deviation between the optical axis of the lens unit and the optical axis of the sensor board unit.

Hence, the sensor board unit 32 is bonded to the lens unit 20A via the adhesive 52 as shown in FIG. 45.

At the time of the bonding, the focal distance and rotational inclination are adjusted to optimal positions to eliminate the deviation between the optical axis O of the lens unit 20A and the optical axis O of the sensor board unit 32. In other words, adjustment is made so that the center of the imaging element 3224 is aligned with the center of the optical axis O and the focusing position of the lens group 22.

In this way, the sensor board 3222 of the sensor board unit 32 is bonded to the board mounting face 2426a of the holding member 24A.

Next, temporary fixing is performed by UV-irradiating the above-mentioned bonded portions and then permanent fixing is performed by thermosetting in an oven.

As a result, a first camera module (20A, 32) in which the sensor board unit 32 is fixed to the lens unit 20A is assembled.

Next, a method for mounting the bracket 70 on the first camera module (20A, 32) will be described referring to FIGS. 47 to 50.

Figure 47:
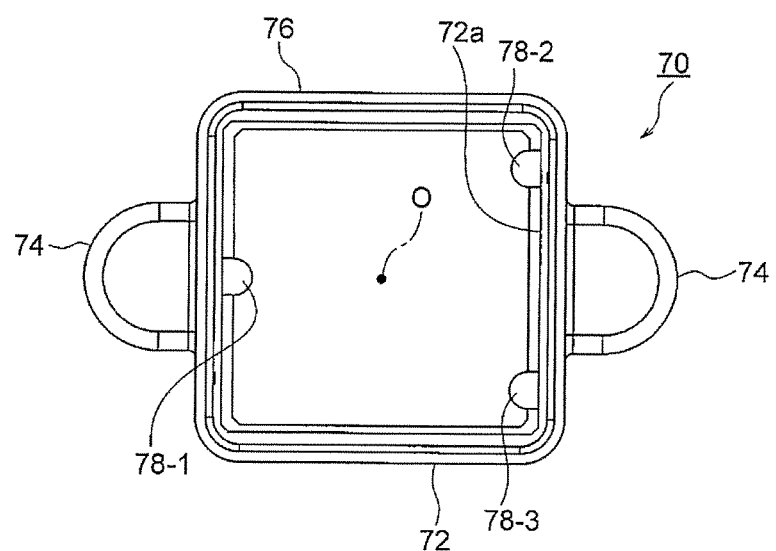
FIG. 47 is a plan view showing a bracket for use in the camera device shown in FIG. 41.

FIG. 47 is a plan view showing the bracket 70.

The bracket 70 has first to third board receiving portions 78-1, 78-2 and 78-3 protruding inward from the board accommodating inner wall face 72a of the cylindrical section 72 thereof as shown in FIG. 47. The first board receiving portion 78-1 is formed at the central section of the left wall face of the board accommodating inner wall face 72a in the left-right direction Y. The second and third board receiving portions 7-2 and 78-3 are formed on the sides of both the end sections of the right wall face of the board accommodating inner wall face 72a in the left-right direction Y so as to be symmetrical with respect to the straight line passing through the optical axis O in the left-right direction Y.

Figure 48:
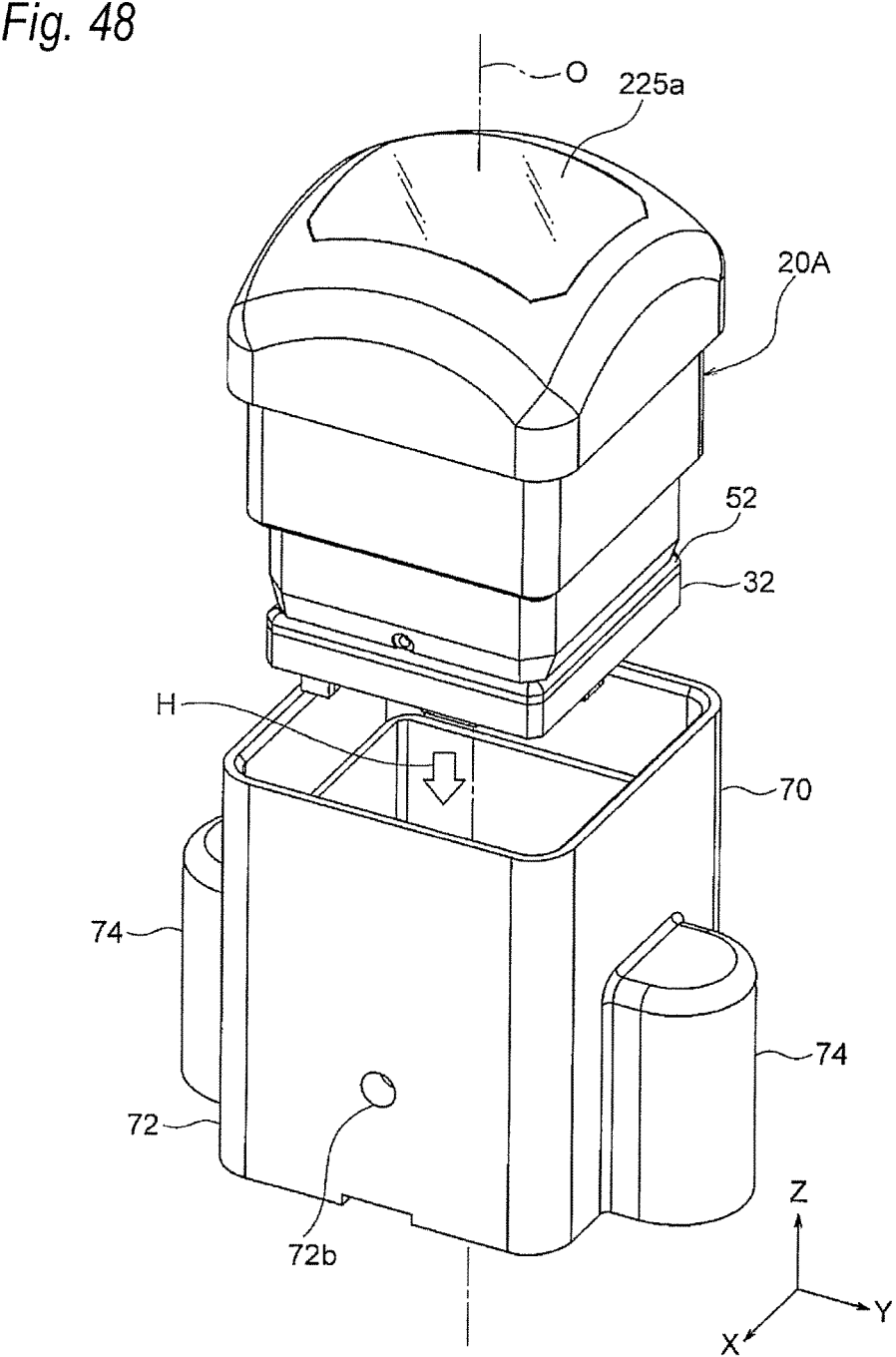
FIG. 48 is a perspective view showing a state in which the first camera module shown in FIG. 45 is being inserted from above into the bracket shown in FIG. 47.

The first camera module (20A, 32) is inserted into the bracket 70 from above the bracket 70 as indicated by a hollow arrow H in FIG. 48.

Figure 49:
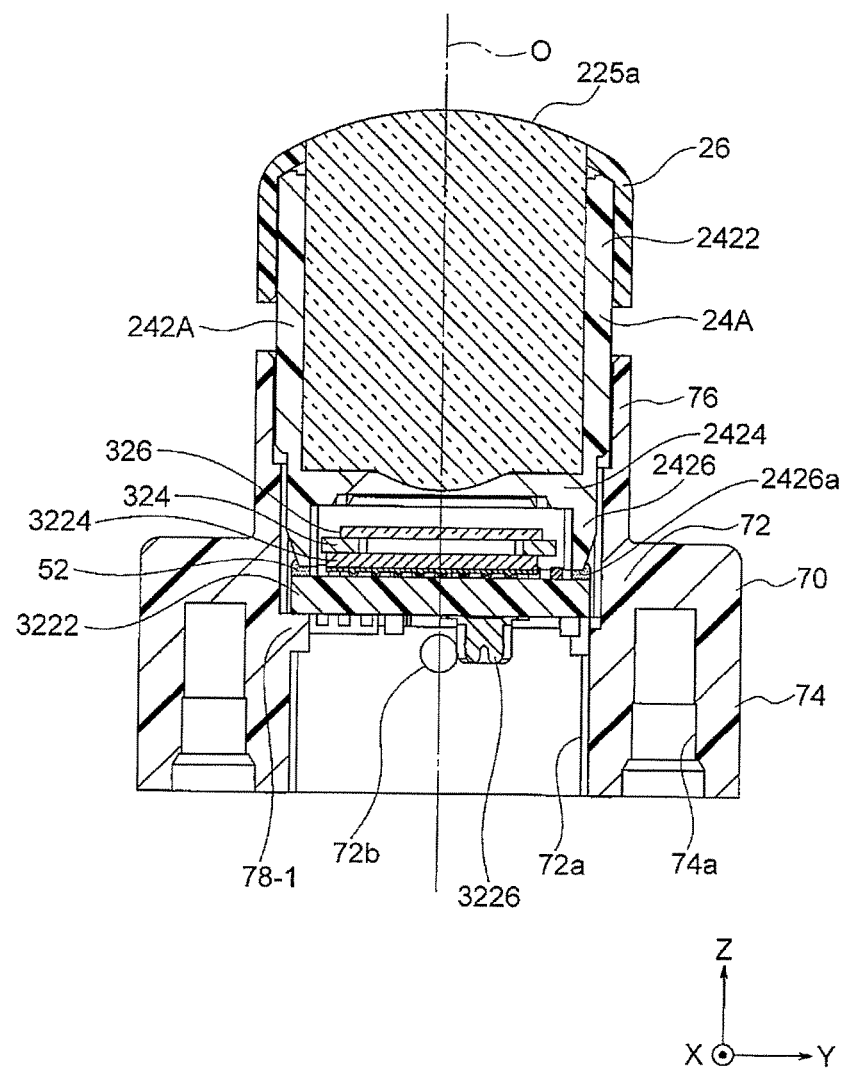
FIG. 49 is a vertical sectional view showing a state in which the camera module shown in FIG. 45 has been inserted to the first to third board receiving portions of the bracket shown in FIG. 47.

At this time, the first camera module (20A, 32) is inserted to the first to third board receiving portions 78-1, 78-2 and 78-3 of the bracket 70 as shown in FIG. 49.

Figure 50:
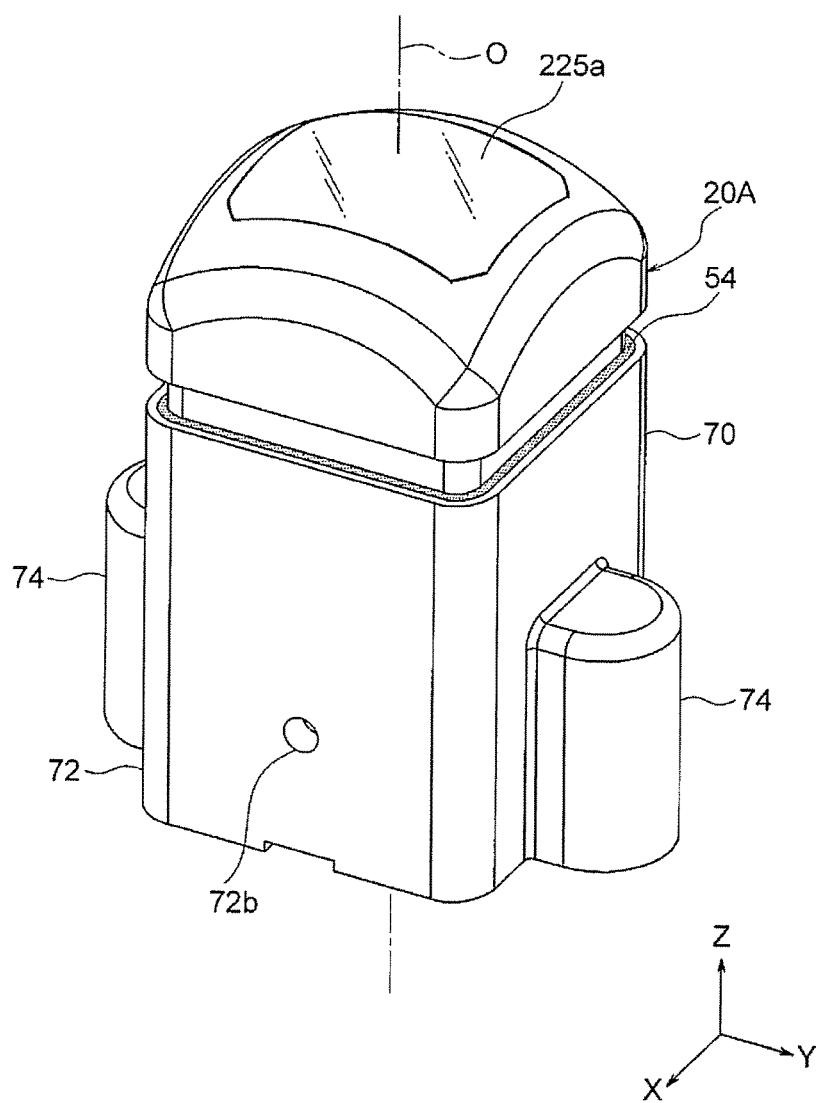
FIG. 50 is a perspective view showing a state in which adhesive has been applied to the periphery of the upper opening of the bracket.

After that, adhesive 54 made of epoxy resin, for example, is applied to the periphery of the upper opening of the bracket 70 as shown in FIG. 50. The adhesive 54 is then thermoset in an oven.

In this way, the bracket 70 is mounted on the first camera module (20A, 32).

Next, a method for mounting the power source board unit 34 on the first camera module (20A, 32) on which the bracket 70 has been mounted will be described referring to FIGS. 51 to 54.

Figure 51:
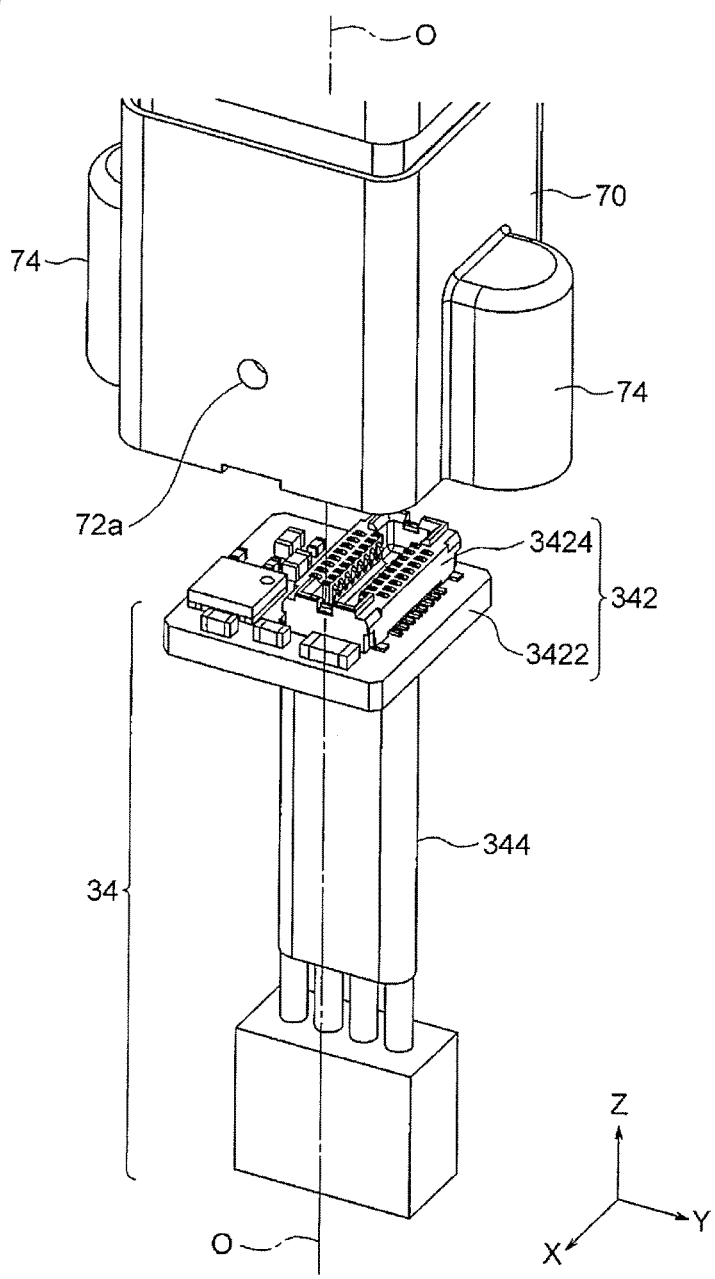
FIG. 51 is an exploded perspective view showing a state in which the power source board unit shown in FIG. 25 is being inserted from below into the board accommodating space of the first camera module on which the bracket shown in FIG. 50 is mounted.
Figure 52:
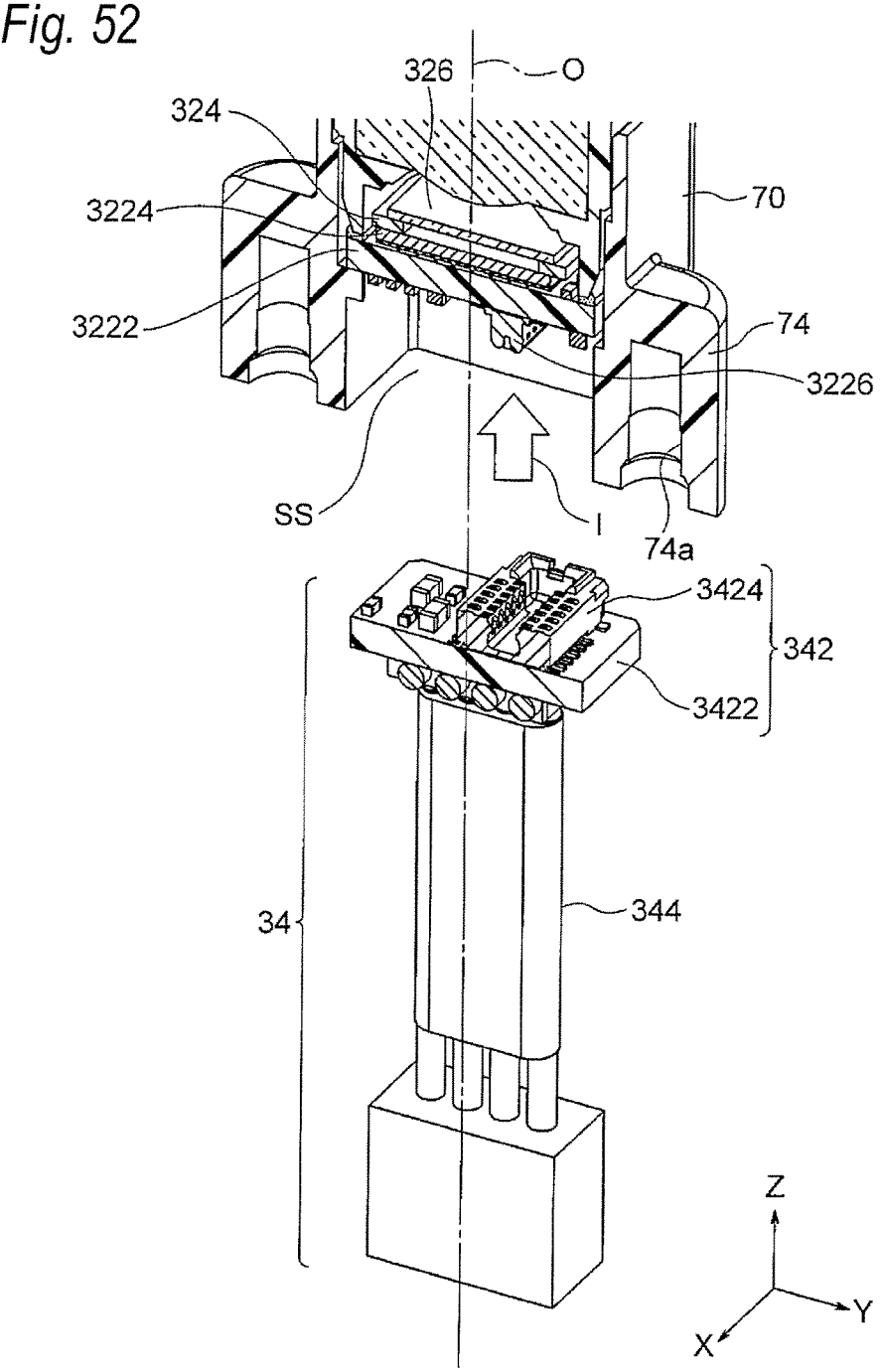
FIG. 52 is an exploded sectional perspective view showing a state in which the power source board unit shown in FIG. 25 is being inserted from below into the board accommodating space of the first camera module on which the bracket shown in FIG. 50 is mounted.

The power source board unit 34 is inserted from below into the board accommodating space SS of the first camera module (20A, 32) as shown in FIG. 51 and as indicated by a hollow arrow I in FIG. 52.

Figure 53:
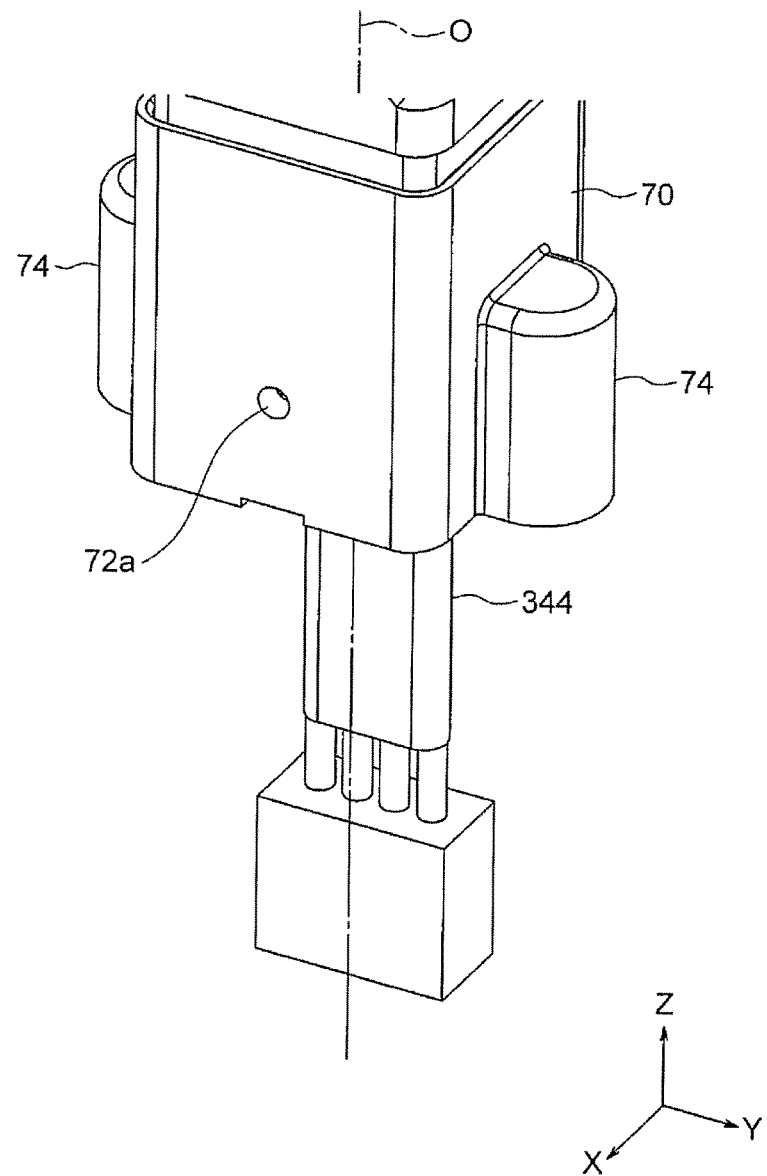
FIG. 53 is a perspective view showing a state in which a second camera module has been assembled by fitting the first connector of the sensor board unit into the second connector of the power source board unit.
Figure 54:
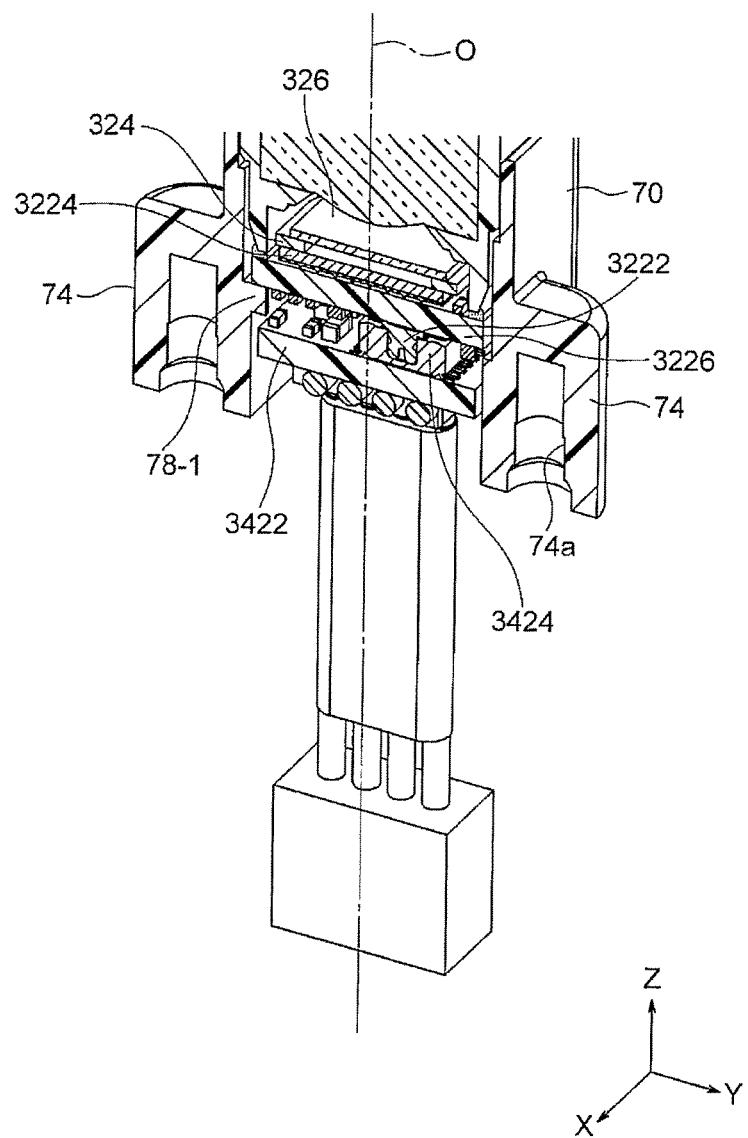
FIG. 54 is a sectional perspective view showing a state in which the second camera module has been assembled by fitting the first connector of the sensor board unit into the second connector of the power source board unit.

Furthermore, the first connector (plug connector) 3226 of the sensor board unit 32 is fitted into the second connector (receptacle connector) 3424 of the power source board unit 34 as shown in FIGS. 53 and 54. As a result, the board unit 30 in which the sensor board unit 32 and the power source board unit 34 are fitted via the inter-board connector (3226, 3424) is assembled. The combination of the lens unit 20A, the bracket 70 and the board unit 30 is referred to as a second camera module (20A, 70, 30).

In the end, a method for sealing the lower section of the bracket 70 of the second camera module (20A, 70, 30) with the sealing member 40 will be described referring to FIGS. 55 and 56 and also referring to FIGS. 34 and 35.

Figure 55:
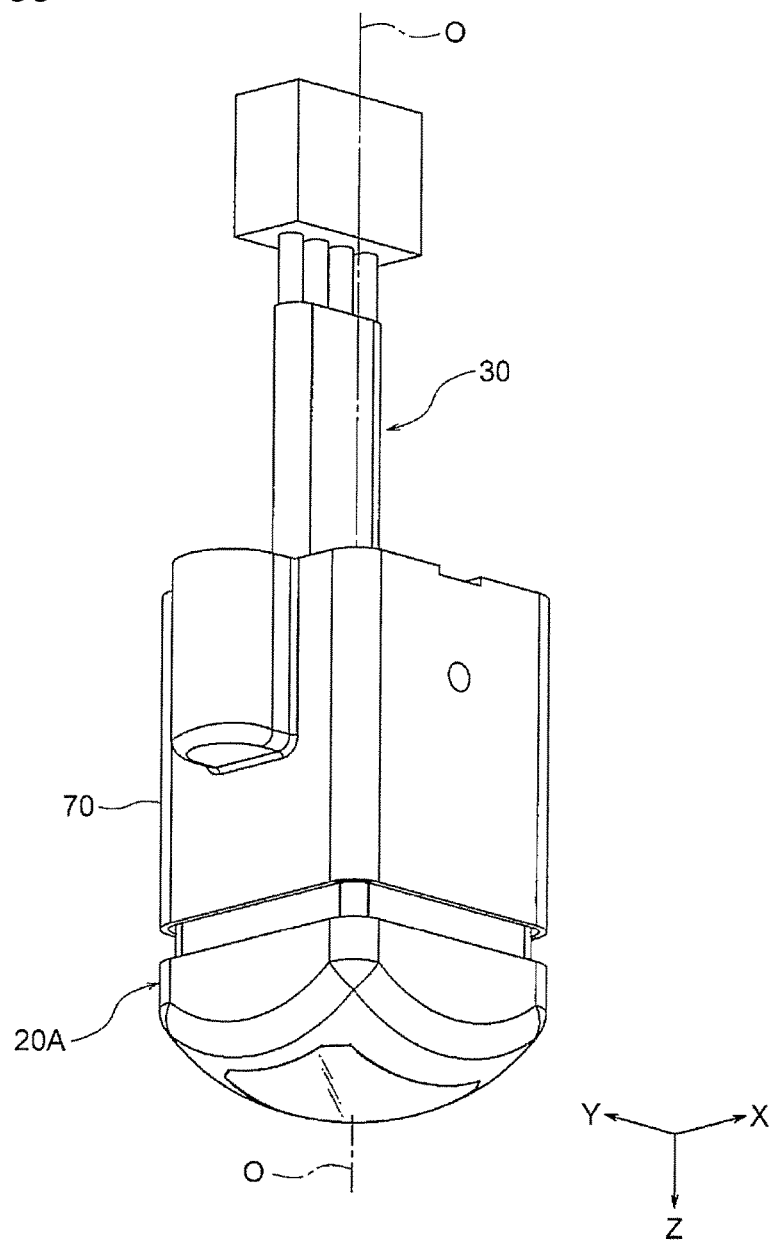
FIG. 55 is a perspective view showing a state in which the second camera module shown in FIG. 53 has been turned upside down.

First, the second camera module (20A, 70, 30) is turned upside down as shown in FIG. 55.

Next, the second camera module (20A, 70, 30) having been turned upside down is set in the dedicated metal mold 60 in a way similar to that shown in FIG. 34. Then, the hot melt adhesive 42 is injected into the metal mold 60 as indicated by the arrow E in FIG. 34, whereby the interior of the second camera module (20A, 70, 30) is filled with the hot melt adhesive 42. As a result, the clearance (board accommodating space SS) between the bracket 70 and the board unit 30 is sealed with the hot melt adhesive 42. Then, the hot melt adhesive 42 is allowed to cure spontaneously at normal temperature. At this time, as shown in FIG. 34, the resin pool 44 is formed inside the metal mold 60.

Then, the metal mold 60 is removed from the second camera module (20A, 70, 30) that has been filled with the hot melt adhesive 42, and the resin pool 44 is cut off in a way similar to that shown in FIG. 35.

Figure 56:
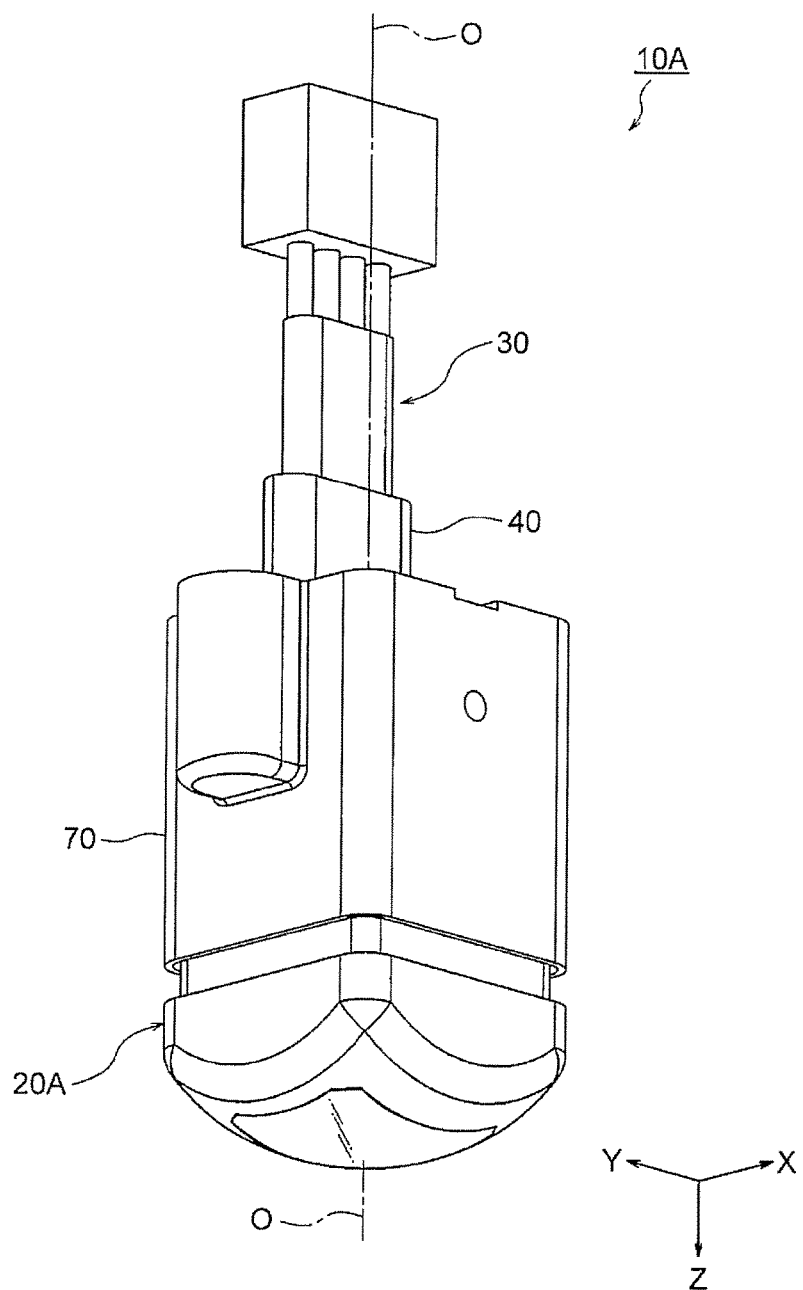
FIG. 56 is a perspective view showing a state in which the camera device shown in FIG. 41 has been assembled by sealing the lower section of the bracket of the second camera module shown in FIG. 55 with a sealing member.

As a result, the lower section of the bracket 70 is sealed with the sealing member 40 as shown in FIG. 56.

In this way, the camera device 10A shown in FIGS. 41 to 43 is assembled.

Summarizing the above descriptions, the method for assembling the camera device 10A further includes, in addition to the steps in the above-mentioned method for assembling the lens unit 20A, a module assembling step for assembling a camera module (20A, 32) by abutting a sensor board unit (32) including a sensor board assembly (322) on which an imaging element (3224) is mounted to the lower end of a barrel (242A) and by fixing the sensor board unit (32) to the lower end of the barrel (242A) while making adjustment so that the center of the imaging element (3224) is aligned with the center of the optical axis (O) and the focusing position of the lens group (22); a module mounting step for mounting the camera module (20A, 32) by inserting the camera module into a bracket (70) for mounting the camera device on another apparatus; a power source board unit assembling step for assembling a power source board unit (34) by soldering the cables (3442) of a harness assembly (344) to a power source board assembly (342); a unit assembling step for assembling a board unit (30) by fitting the power source board unit (34) to the sensor board unit (32) via an inter-board connector (3226, 3424); and a sealing step for sealing the lower section of the bracket (70) with a sealing member (40).

As made clear by the above descriptions, with the second embodiment of the present invention, the camera device 10A can be assembled more easily than the camera device 10A according to the above-mentioned first embodiment.

The reason for that is as described below. Since the barrel 242A and the bracket 70 are separated in the camera device 10A according to the second embodiment of the present invention, the number of components is larger than that in the camera device 10 according to the first embodiment. However, since the holding member 24 of the camera device 10 according to the first embodiment is configured such that the barrel section 242 and the bracket section 244 are integrated, too many functions are incorporated in the holding member 24. On the other hand, since the barrel section 242A and the bracket 70 are separated in the second embodiment of the present invention, the functions of the holding member 24 in the first embodiment can also be separated, whereby the assembling can be performed more easily.

An exemplary embodiment according to the present invention will be described.

With a first exemplary embodiment according to the present invention, it is possible to obtain a method for assembling a camera device (10; 10A) including a lens group preparing step for preparing a lens group (22) composed of a plurality of lenses (221 to 225) each having an outer shape not having the area that is not used by an imaging element (3224); a lens group holding step for sequentially inserting the plurality of lenses (221 to 225) from above into a cylindrical holding member (24; 24A) having a lens accommodating inner wall face (2422a) conforming to the outer shape of the lens group (22) and for holding the lens group (22) inside the holding member (24; 24A); and a retainer mounting step, in a state in which the upper face (255a) of the upper lens (225) of the lens group (22) provided at the upper end of the holding member (24; 24A) is exposed, for mounting a retainer (26) having an opening (264a) on the upper end of the holding member (24; 24A) so as to enclose the outer peripheral edge of the upper lens (225).

In the method for assembling the above-mentioned camera device (10; 10A), the outer shape of the above-mentioned lens group (22) is preferably rectangular. The above-mentioned retainer mounting step may be a step for mounting the retainer (26) by fixing the retainer to the upper end of the holding member (24; 24A) with adhesive (52).

Furthermore, in the method for assembling the above-mentioned camera device (10), the holding member (24) may include a barrel section (242) for light-shielding the lens group (22) and a bracket section (244) for mounting the camera device (10) on another apparatus and may have a structure in which the barrel section (242) and the bracket section (244) are integrated.

In this case, the method for assembling the above-mentioned camera device (10) may further include a sensor board unit preparing step for preparing a sensor board unit (32) including a sensor board assembly (322) on which an imaging element (3224) is mounted; a power source board unit assembling step for assembling a power source board unit (34) by mounting a harness assembly (344) on a power source board assembly (342); a board unit assembling step for assembling a board unit (30) by joining the power source board unit (34) and the sensor board unit (32); a board unit fixing step for inserting the board unit (30) from below into a holding member (24) and for fixing the sensor board unit (32) of the board unit (30) to the board accommodating inner wall face (2442a) of the holding member (24) communicating with a lens accommodating inner wall face (2422a) and provided under the holding member (24) while making adjustment so that the center of the imaging element (3224) is aligned with the center of the optical axis (0) and the focusing position of the lens group (22); and a sealing step for sealing the lower section of the holding member (24) with a sealing member (40). The above-mentioned board unit fixing step may be a step for fixing the sensor board unit (32) to the board accommodating inner wall face (2442a) of the holding member (24) with adhesive (52). The above-mentioned sealing step may be a step for sealing the clearance (SS) between the holding member (24) and the board unit (30) with the sealing member (40) by filling the lower section of the holding member (24) with adhesive (42).

Instead of the above-mentioned configuration, the holding member (24A) may be composed of a barrel (242A) for light-shielding the lens group (22) in the method for assembling the above-mentioned camera device (10A).

In this case, the method for assembling the camera device (10A) may further include a module assembling step for assembling a camera module (20A, 32) by abutting a sensor board unit (32) including a sensor board assembly (322) on which an imaging element (3224) is mounted to the lower end of a barrel (242A) and by fixing the sensor board unit (32) to the lower end of the barrel (242A) while making adjustment so that the center of the imaging element (3224) is aligned with the center of the optical axis (O) and the focusing position of the lens group (22); a module mounting step for mounting the camera module (20A, 32) by inserting the camera module into the bracket (70) for mounting the camera device (10A) on another apparatus; a power source board unit assembling step for assembling a power source board unit (34) by mounting a harness assembly (344) on a power source board assembly (342); a unit assembling step for assembling a board unit (30) by joining the power source board unit (34) to the sensor board unit (32); and a sealing step for sealing the lower section of the bracket (70) with a sealing member (40). The above-mentioned module assembling step may be a step for fixing the sensor board unit (32) to the lower end of the barrel (242A) with adhesive (52). The above-mentioned sealing step may be a step for sealing the clearance (SS) between the barrel (242A) and the board unit (30) with the sealing member (40) by filling the lower section of the barrel (242A) with adhesive (42).

In the method for assembling the above-mentioned camera device (10; 10A), the camera device (10; 10A) may be composed of a vehicle-mounted camera mounted on a vehicle body.

With a second exemplary embodiment according to the present invention, it is possible to obtain a method for assembling a lens unit (20; 20A) for use in a camera device (10; 10A) including a lens group preparing step for preparing a lens group (22) composed of a plurality of lenses (221 to 225) each having an outer shape not having the area that is not used by an imaging element (3224); a lens group holding step for sequentially inserting the plurality of lenses (221 to 225) from above into a cylindrical holding member (24; 24A) having a lens accommodating inner wall face (2422a) conforming to the outer shape of the lens group (22) and for holding the lens group (22) inside the holding member (24; 24A); and a retainer mounting step, in a state in which the upper face (255a) of the upper lens (225) of the lens group (22) provided at the upper end of the holding member (24; 24A) is exposed, for mounting a retainer (26) having an opening (264a) on the upper end of the holding member (24; 24A) so as to enclose the outer peripheral edge of the upper lens (225).

In the method for assembling the above-mentioned lens unit (20; 20A), the outer shape of the lens group (22) is preferably rectangular. The above-mentioned retainer mounting step may be a step for mounting the retainer (26) by fixing the retainer to the upper end of the holding member (24; 24A) with adhesive.

Still further, the above-mentioned holding member (24) may include a barrel section (242) for light-shielding the lens group (22) and a bracket section (244) for mounting the camera device (10) on another apparatus and may have a structure in which the barrel section (242) and the bracket section (244) are integrated.

Instead of the above-mentioned configuration, the above-mentioned holding member (24A) may be composed of a barrel (242A) for light-shielding the lens group (22).

The reference signs in the above parentheses are given to facilitate the understanding of the present invention; the reference signs are merely examples, and the present invention is not limited by these reference signs as a matter of course.

Although the present invention has been described referring to the embodiments thereof, the present invention is not limited to the above-mentioned embodiments. The configurations and details of the present invention can be subjected to various modifications that can be understood by those skilled in the art within the scope of the present invention.

For example, although the sealing of the lower section of the holding member (bracket) using a sealing member is carried out by filling the lower section with hot melt adhesive, the sealing is not limited to this method, but other sealing methods may also be adopted.

INDUSTRIAL APPLICABILITY

The camera device according to the present invention is not limited to a vehicle-mounted camera, but can also be used as a camera for use in other fields (for example, medical field).

The present application claims priority on the basis of Japanese Patent Application 2015-090377 filed on Apr. 27, 2015, and the entire disclosure thereof is herein incorporated.

DESCRIPTION OF REFERENCE NUMERALS AND SIGNS 10 camera device (vehicle-mounted camera)
10A camera device (vehicle-mounted camera)
20 lens unit
20A lens unit
22 lens group
221 first lens
222 second lens
223 third lens
224 fourth lens (lower lens)
225 fifth lens (upper lens)
225a upper face
24 holding member
24A holding member
242 barrel section
242A barrel
2422 cylindrical section
2422a lens accommodating inner wall face
2422b retainer receiving face
2424 engagement section
2424a engaging face
2426 lower extension section
2426a board mounting face
244 bracket section
2442 cylindrical section
2442-1 lower cylindrical section
2442-2 upper cylindrical section
2442a board accommodating inner wall face
2442b board mounting face
2442c air vent hole
2444 screw holding section
2444a screw insertion hole
2446 abutting section
2448-1 first protrusion
2448-2 second protrusion
2448-3 third protrusion
26 retainer
262 outer cylindrical section
264 upper end section
264a opening
30 board unit (PWB unit)
32 sensor board unit (sensor PWB unit)
322 sensor board assembly (sensor PWB assembly)
3222 sensor board
3222-1 first slit
3222-2 second slit
3222-3 third slit
3224 imaging element
3226 first connector (sensor-side connector; plug connector)
324 adhesive tape
326 infrared ray cut filter (IRCF)
34 power source board unit (power source PWB unit)
342 power source board assembly (power source PWB assembly)
3422 power source board (power source PWB)
3424 second connector (power source side connector; receptacle connector)
344 harness assembly
3422 cable (wire)
40 sealing member
42 adhesive (hot melt adhesive)
44 resin pool
52 adhesive
54 adhesive
60 metal mold
70 bracket
72 cylindrical section
72a board accommodating inner wall face
72b air vent hole
74 screw holding section
74a screw insertion hole
76 upper extension section
78-1 first board receiving portion
78-2 second board receiving portion
78-3 third board receiving portion
LS lens accommodating space
SS board accommodating space
AM automobile
VC vehicle-mounted camera
O optical axis
X front-rear direction (second direction)
Y left-right direction (first direction)
Z up-down direction

The invention claimed is:

1. A method for assembling a camera device comprising:
a lens group preparing step for preparing a lens group composed of a plurality of lenses each having an outer shape not having an area that is not used by an imaging element,
a lens group holding step for sequentially inserting the plurality of lenses into a cylindrical holding member from an upper end thereof having a lens accommodating inner wall face conforming to the outer shape of the lens group and for holding the lens group inside the holding member, and
a retainer mounting step, in a state in which an upper face of an upper lens of the lens group provided at an upper end of the holding member is exposed, for mounting a retainer having an opening on the upper end of the holding member so as to enclose an outer peripheral edge of the upper lens, wherein the retainer mounting step is performed after the lens group holding step.

2. The method for assembling the camera device according to claim 1, wherein the outer shape of the lens group is rectangular.

3. The method for assembling the camera device according to claim 1, wherein the retainer mounting step is a step for mounting the retainer by fixing the retainer to the upper end of the holding member with adhesive.

4. The method for assembling the camera device according to claim 1, wherein
the holding member includes a barrel section for light-shielding the lens group and a bracket section for mounting the camera device on another apparatus and has a structure in which the barrel section and the bracket section are integrated, the method further comprising:
a sensor board unit preparing step for preparing a sensor board unit including a sensor board assembly on which an imaging element is mounted,
a power source board unit assembling step for assembling a power source board unit by mounting a harness assembly to a power source board assembly,
a board unit assembling step for assembling a board unit by joining the power source board unit and the sensor board unit,
a board unit fixing step for inserting the board unit from below into the holding member and for fixing the sensor board unit of the board unit to the board accommodating inner wall face of the holding member communicating with a lens accommodating inner wall face and provided under the holding member while making adjustment so that a center of the imaging element is aligned with a center of the optical axis and a focusing position of the lens group, and
a sealing step for sealing a lower section of the holding member with a sealing member.

5. The method for assembling the camera device according to claim 4, wherein
the board unit fixing step is a step for fixing the sensor board unit to the board accommodating inner wall face of the holding member with adhesive.

6. The method for assembling the camera device according to claim 4, wherein
the sealing step is a step for sealing the clearance between the holding member and the board unit with the sealing member by filling the lower section of the holding member with adhesive.

7. The method for assembling the camera device according to claim 1, wherein
the holding member is composed of a barrel for light-shielding the lens group, the method further comprising:
a module assembling step for assembling a camera module by abutting a sensor board unit including a sensor board assembly on which the imaging element is mounted to a lower end of the barrel and by fixing the sensor board unit to the lower end of the barrel while making adjustment so that a center of the imaging element is aligned with a center of the optical axis and a focusing position of the lens group,
a module mounting step for mounting the camera module by inserting the camera module into the bracket for mounting the camera device on another apparatus,
a power source board unit assembling step for assembling a power source board unit by mounting a harness assembly on a power source board assembly,
a unit assembling step for assembling a board unit by joining the power source board unit to the sensor board unit, and
a sealing step for sealing a lower section of the bracket with the sealing member.

8. The method for assembling the camera device according to claim 7, wherein
the module mounting step is a step for fixing the sensor board unit to the lower end of the barrel with adhesive.

9. The method for assembling the camera device according to claim 7, wherein
the sealing step is a step for sealing the clearance between the bracket and the board unit with the sealing member by filling the lower section of the bracket with adhesive.

10. The method for assembling the camera device according to claim 1, wherein
the camera device is formed of a vehicle-mounted camera to be mounted on a vehicle body.

11. The method for assembling the camera device according to claim 1 wherein the upper lens of the lens group is inserted into the opening of the retainer.

12. The method for assembling the camera device according to claim 1 wherein a lower section of the lens accommodating inner wall face includes an engaging section protruding inward from the lens accommodating inner wall face so as to engage with a lower lens of the lens group.

13. A method for assembling a lens unit for use in a camera device comprising:
a lens group preparing step for preparing a lens group composed of a plurality of lenses each having an outer shape not having an area that is not used by an imaging element,
a lens group holding step for sequentially inserting the plurality of lenses into a cylindrical holding member from an upper end thereof having a lens accommodating inner wall face conforming to an outer shape of the lens group and for holding the lens group inside the holding member, and
a retainer mounting step, in a state in which an upper face of the upper lens of the lens group provided at an upper end of the holding member is exposed, for mounting a retainer having an opening on the upper end of the holding member so as to enclose an outer peripheral edge of the upper lens, wherein the retainer mounting step is performed after the lens group holding step.

14. The method for assembling the lens unit according to claim 13, wherein
the outer shape of the lens group is rectangular.

15. The method for assembling the lens unit according to claim 13, wherein
the retainer mounting step is a step for mounting the retainer by fixing the retainer to the upper end of the holding member with adhesive.

16. The method for assembling the lens unit according to any claim 13, wherein
the holding member includes a barrel section for light-shielding the lens group and a bracket section for mounting the lens apparatus on another apparatus and has a structure in which the barrel section and the bracket section are integrated.

17. The method for assembling the lens unit according to claim 13, wherein
the holding member is composed of a barrel section for light-shielding the lens group.

18. The method of assembling the lens unit according to claim 13 wherein the upper lens of the lens group is inserted into the opening of the retainer.

19. The method of assembling the lens unit according to claim 13 wherein a lower section of the lens accommodating inner wall face includes an engaging section protruding inward from the lens accommodating inner wall face so as to engage with a lower lens of the lens group.

\* \* \* \* \*